(12) United States Patent
Tindall

(10) Patent No.: US 11,366,370 B1
(45) Date of Patent: Jun. 21, 2022

(54) ARC-SHAPED ILLUMINATOR

(71) Applicant: John R. Tindall, Oak Park, CA (US)

(72) Inventor: John R. Tindall, Oak Park, CA (US)

(*) Notice: Subject to any disclaimer, the term of this patent is extended or adjusted under 35 U.S.C. 154(b) by 0 days.

(21) Appl. No.: 17/185,041

(22) Filed: Feb. 25, 2021

(51) Int. Cl.
| | |
|---|---|
| *G03B 15/03* | (2021.01) |
| *F21S 4/20* | (2016.01) |
| *G03B 15/07* | (2021.01) |
| *F21Y 105/14* | (2016.01) |
| *F21Y 103/30* | (2016.01) |
| *F21V 9/08* | (2018.01) |
| *F21Y 113/10* | (2016.01) |

(52) U.S. Cl.
CPC ............... *G03B 15/03* (2013.01); *F21S 4/20* (2016.01); *G03B 15/07* (2013.01); *F21V 9/08* (2013.01); *F21Y 2103/30* (2016.08); *F21Y 2105/14* (2016.08); *F21Y 2113/10* (2016.08)

(58) Field of Classification Search
CPC ........ G03B 15/03; G03B 15/06; G03B 15/07; F21S 4/20; F21S 4/22; F21S 4/24; F21V 9/08; F21Y 2105/14; F21Y 2113/10
See application file for complete search history.

(56) References Cited

U.S. PATENT DOCUMENTS

| | | | | |
|---|---|---|---|---|
| 7,429,117 B2* | 9/2008 | Pohlert | ................... | G03B 15/05 362/11 |
| 10,734,441 B1* | 8/2020 | Schweid | ................ | H05B 45/10 |
| 2014/0362555 A1* | 12/2014 | Turk | ..................... | F21V 23/002 362/3 |
| 2017/0123295 A1* | 5/2017 | Williams | .............. | G06F 1/1656 |
| 2019/0346745 A1* | 11/2019 | Tindall | ................... | G03B 15/06 |

OTHER PUBLICATIONS

Cook, Jeremy; 2020 [retrieved 2021]; Retrieved from the Internet: https://www.hackster.io/news/an-over-engineered-arc-shaped-led-lamp-e874203f0447.

* cited by examiner

*Primary Examiner* — Alan B Cariaso
(74) *Attorney, Agent, or Firm* — Stetina Brunda Garred & Brucker

(57) ABSTRACT

One or more slit arc-shaped (vertex) illuminators (SAVI) have unique interactions when illuminating objects, especially convex or concave curves on spheroidal objects such as the human face creating proximity dependent enhanced dynamic illumination. When multiple SAVI are used, with adjoining vertices, adjustments made to the intensity of individual SAVI dramatically change the visual appearance of convex and concave radial curves shapes on the subject. In portrait photography, the illumination balance of opposing SAVIs offers novel controlled distortion that adjusts facial contours to achieve a desired effect, e.g., apparent thinning or other esthetic goals. When photographing different human skin types (light vs. dark tones) the arc geometry of the beams also manipulates the BDRF (Bidirectional reflectance distribution function) rendering evenly distributed illumination boundaries while also avoiding distortions (toroidal or curvature flattening) associated with other illumination shapes such as squares, rectangles, or circles.

19 Claims, 28 Drawing Sheets
(2 of 28 Drawing Sheet(s) Filed in Color)

Example of Different
SAVI Configurations

Single SAVI
(Vertex on Right)

Single SAVI
(Vertex on Left)

Dual SAVI
(Side by Side Horizontal)

Dual SAVI
(Side by Side Vertical)

Triple SAVI

Quad SAVI

Dual SAVI
Matching Direction of Vertices

ARC-SHAPED ILLUMINATOR

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates to the illumination of subjects for photography and cinematography.

2. Related Art

Artificial lighting techniques go back to using wood fires, oil lamps, and flammable gas. Throughout the 18th and 19th centuries, simple lens systems came into use for basic illumination and also to serve the needs of commerce such as lighthouses for marking dangerous waters. The majority of the illumination sources of early lights was some form of flame (candles, gas, etc.). With the invention of the incandescent lightbulb and the availability of electricity, the lamps became more powerful light sources.

In the 20th century, lighting for photography and cinema followed three basic designs: point source using an illuminator and lens (usually a Fresnel lens) fixtures for aiming and focusing the light on subjects. A second style of lighting uses rectangular or round (such as an umbrella) surfaces, where the illuminators cast light onto a Lambertian surface and this reflected light is then used to light subjects. The final style is use of white (or any color) diffusion substrates that are stretched on a frame and placed in front of an illuminator to "soften" the light falling onto the subject. Each one of the above light sources can be moved around the subject to create different moods and effects. However, they tend to render subjects with shadows that often minimize and distort the subjects' true shapes.

Beginning in the late twentieth century, umbrellas of different shapes (octagon, parabolic dishes) are quite common. Also, borrowing from the medical profession, "ring lights" have become very popular. All of these shapes diminish the rendering of edges and curved surfaces of objects—especially the human face. They flatten and distort facial features by eliminating shadows and other three-dimensional cues that we use to visually process the shape of a face. This necessitates the heavy use of makeup to create "normal looking" contouring on the faces.

Some efforts have been made to improve lighting techniques to counter the advances in image capturing techniques, specifically the move away from photochemical imaging to digital imaging, which has a "harder" look that accentuates flaws in the subject, especially the human face. Softening the source via Lambertian diffusers has been the main tool employed by lighting manufacturers and photographers, but as already stated, at the cost of shape definition.

There are currently no lighting devices specifically designed to accentuate and control the specific geometry of photographic subjects, including complex concave and convex shapes such as those found on the human face or other irregular shapes.

BRIEF SUMMARY

The present disclosure contemplates various systems, methods, and devices that eliminate the drawbacks of current lighting techniques by using the geometry of illuminators to alter the apparent shape and texture of photographic subjects. One aspect of the embodiments of the present disclosure is a method of illuminating a subject to be filmed or photographed. The method may comprise providing an illuminator having a first arc-shaped light-emitting portion defining an arc in a plane and positioning the illuminator relative to the subject so that a line extending from the first arc-shaped light-emitting portion to the subject is orthogonal to the plane and the first arc-shaped light-emitting portion faces the same direction as a first curve of the subject.

The positioning of the illuminator may include positioning the illuminator at a distance from the subject that achieves parity between the first arc-shaped light-emitting portion and the first curve of the subject.

The illuminator may have a second arc-shaped light-emitting portion defining another arc in the plane that is offset relative to the arc defined by the first arc-shaped light-emitting portion.

The positioning of the illuminator may include positioning the illuminator relative to the subject so that the second arc-shaped light-emitting portion faces the opposite direction as the first curve of the subject. The positioning of the illuminator may include positioning the illuminator relative to a camera so that the second arc-shaped light-emitting portion is within an angle defined between the line extending from the first arc-shaped light-emitting portion to the subject and a line extending from the camera to the subject.

The positioning of the illuminator may include positioning the illuminator relative to the subject so that the second arc-shaped light-emitting portion faces the same direction as the first curve of the subject.

The arc defined by the second arc-shaped light-emitting portion may be contiguous with the arc defined by the first arc-shaped light-emitting portion. The positioning of the illuminator may include positioning the illuminator relative to the subject so that the second arc-shaped light-emitting portion faces the same direction as a second curve of the subject. The positioning of the illuminator may include positioning the illuminator at a distance from the subject that achieves parity between the first arc-shaped light-emitting portion and the first curve of the subject and between the second arc-shaped light-emitting portion and the second curve of the subject. The method may comprise adjusting an orientation of the second arc-shaped light-emitting portion relative to the first arc-shaped light-emitting portion.

The method may comprise controlling a relative intensity of light emitted by the first and second arc-shaped light-emitting portions. The method may comprise controlling an overall intensity of light emitted by the first and second arc-shaped light-emitting portions while the relative intensity remains constant.

The first and second arc-shaped light-emitting portions may emit light of different colors. The method may comprise applying one or more color filters to the illuminator so that the first and second arc-shaped light-emitting portions emit light of different colors.

The illuminator may comprise an array of light-emitting diodes, with the first arc-shaped light-emitting portion being an illuminated subset thereof. The array of light-emitting diodes may include an unilluminated subset on a concave side of the first arc-shaped light-emitting portion and one or more unilluminated subsets on a convex side of the first arc-shaped light-emitting portion.

The illuminator may comprise a base plate attached to the first arc-shaped light-emitting portion and a mount for mounting the base plate at a position relative to the subject.

Another aspect of the embodiments of the present disclosure is an adjustable illuminator for photography or cinematography. The adjustable illuminator may comprise a first base plate segment, a first arc-shaped light source disposed on the first base plate segment and defining an arc in a plane, a second base plate segment rotatably connected to the first base plate segment, and a second arc-shaped light source disposed on the second base plate segment and defining another arc in the plane.

The adjustable illuminator may comprise an input interface for controlling a relative intensity of light emitted by the first and second arc-shaped light-emitting portions. The input interface may be further for controlling an overall intensity of light emitted by the first and second arc-shaped light-emitting portions while the relative intensity remains constant.

The adjustable illuminator may comprise a mount for mounting the first and second base plate segments at a position relative to a subject to be filmed or photographed.

The first and second arc-shaped light-emitting portions may be disposed on a flexible base plate that includes the first and second base plate segments, the second base plate segment being rotatable relative to the first base plate segment by deformation of the flexible base plate.

Another aspect of the embodiments of the present disclosure is an illuminator for photography or cinematography. The illuminator may comprise a first base plate, a first arc-shaped light source disposed on the first base plate and defining an arc in a plane, a second base plate, and a second arc-shaped light source disposed on the second base plate and defining another arc in the plane, the first and second arc-shaped light sources arranged such that a convex side of the first arc-shaped light source faces a convex side of the second arc-shaped light source.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other features and advantages of the various embodiments disclosed herein will be better understood with respect to the following description and drawings, in which like numbers refer to like parts throughout, and in which.

DETAILED DESCRIPTION

The present disclosure encompasses various embodiments of systems, methods, and devices for illuminating a subject to be filmed or photographed, whether by photochemical or any electronic means. Such devices may sometimes be referred to as Slit Arc Vertex Illuminators (SAVIs) and may be used by photographers, cinematographers, and/or laypersons who want to alter the shapes of subjects, including curved and irregularly shaped subjects, to serve an esthetic or needed effect through a unique but simple to use lighting fixture. The detailed description set forth below in connection with the appended drawings is intended as a description of the several presently contemplated embodiments of these methods and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
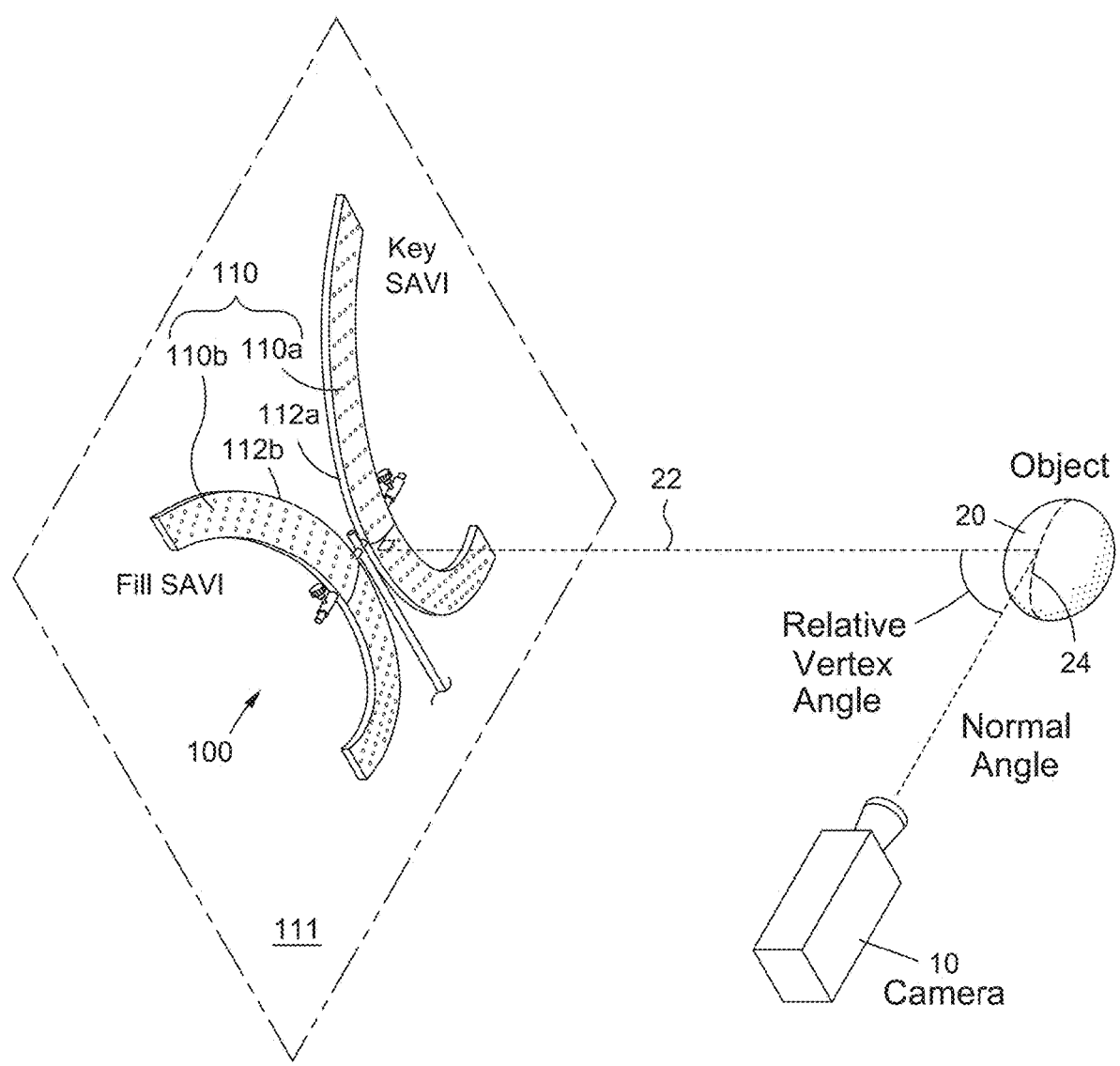
FIG. 1 shows an illuminator according to an embodiment of the present disclosure, together with a camera and a subject to be filmed or photographed.

FIG. 1 shows an illuminator 100 according to an embodiment of the present disclosure, together with a camera 10 and a subject 20 to be filmed or photographed. The illuminator 100 may have one or more arc-shaped light-emitting portions 110 (also referred to as SAVIs) defining one or more respective arcs in a plane 111. In the example of FIG. 1, the illuminator 100 has a first arc-shaped light-emitting portion 110a and a second arc-shaped light-emitting portion 110b that are arranged such that a convex side 112a of the first arc-shaped light-emitting portion 110a faces a convex side 112b of the second arc-shaped light-emitting portion 110b. Considering, for the moment, only the first arc-shaped light-emitting portion 110a, the illuminator 100 may be positioned relative to the subject 20 so that a line 22 extending from the first arc-shaped light-emitting portion 110a to the subject 20 is orthogonal to the plane 111, that is, with the "flat" of the first arc-shaped light-emitting portion 110a facing the subject 20. As such, the shape of the light that shines on the subject corresponds to the arc defined by the first arc-shaped light-emitting portion 110a. With such an arrangement, the illuminator 100 may be positioned relative to the subject 20 so that the first arc-shaped light-emitting portion 110a faces the same direction as a first curve 24 of the subject 20 as shown, in this case the curved edge of a spheroid. More specifically, the first arc-shaped light-emitting portion 110a and the first curve 24 may be regarded as facing in the same direction as long as a majority of normal vectors of the first curve 24 have the same direction as at least one normal vector of the first arc-shaped light-emitting portion 110a (with normal vectors defined to point toward the center of curvature, for example). Owing to such directional alignment of the first arc-shaped light-emitting portion 110a with the first curve 24, the distortion associated with traditional lighting can be avoided, resulting in a more faithful representation of the first curve 24 in an image of the subject 20 captured by the camera 10.

Figure 2:
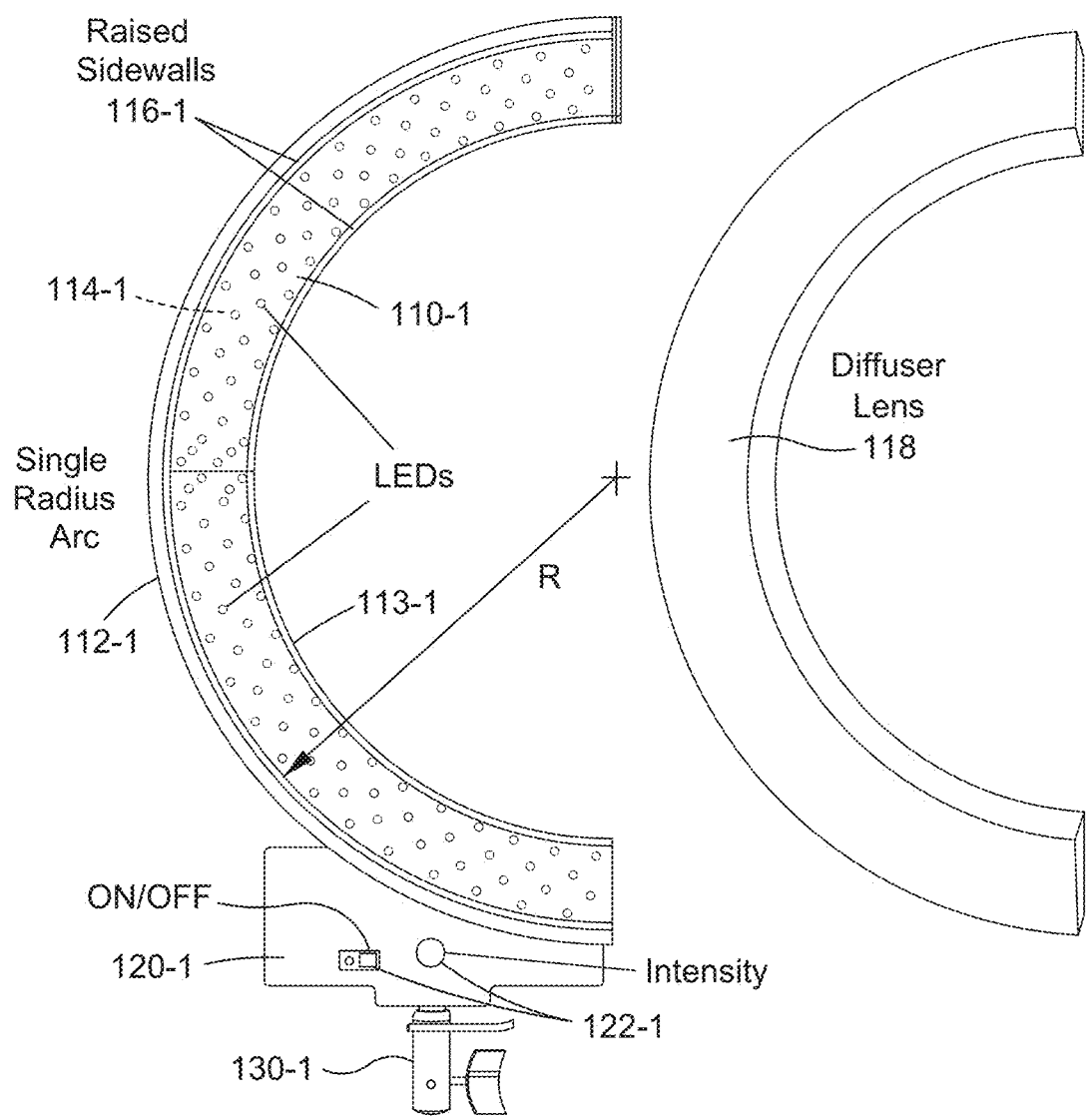
FIG. 2 shows an illuminator having a single arc-shaped light-emitting portion.
Figure 6:
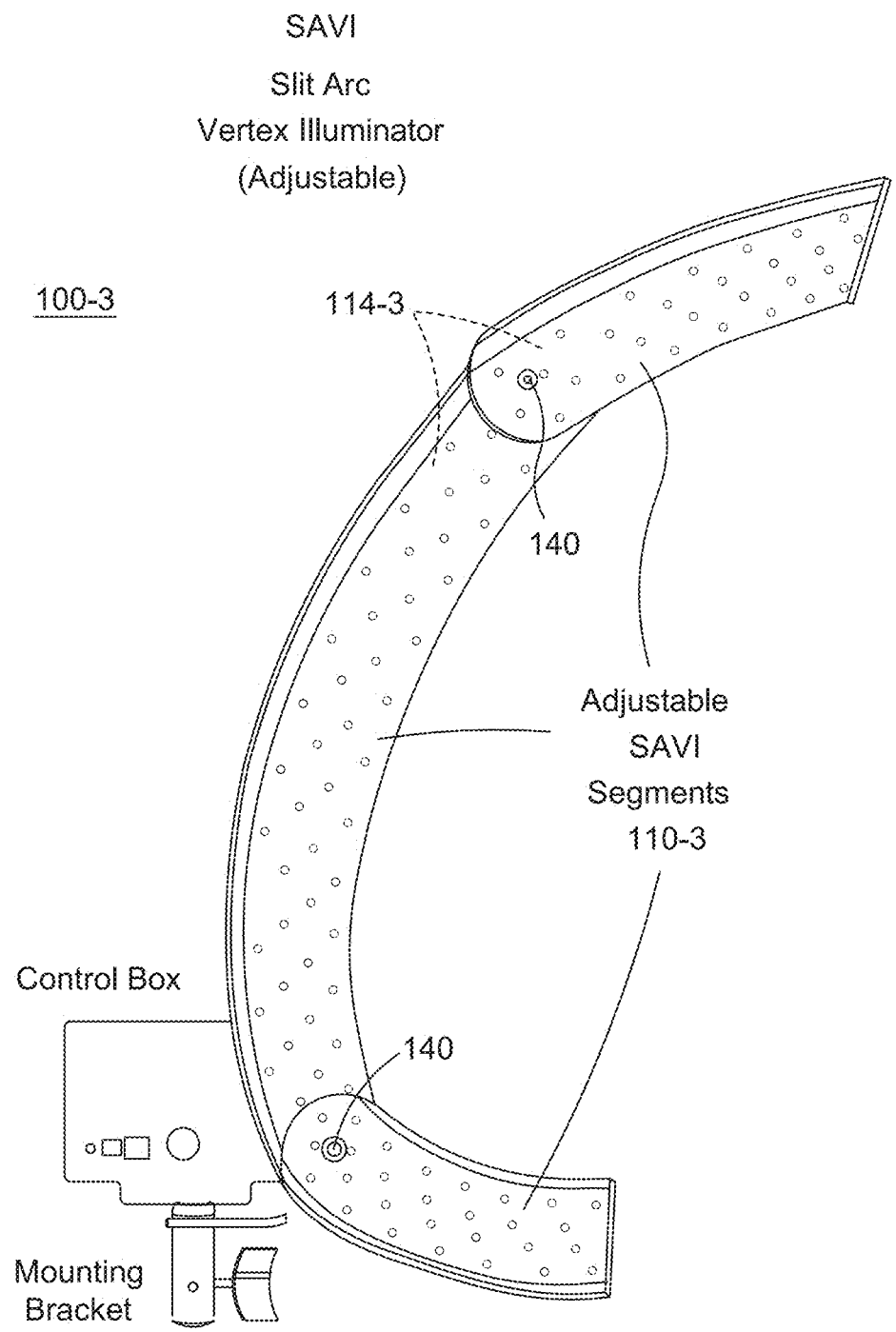
FIG. 6 shows an illuminator having multiple contiguous arc-shaped light-emitting portions.

FIG. 2 shows an illuminator 100-1 having a single arc-shaped light-emitting portion 110-1. Such a device as shown in FIG. 2, including a single light-emitting portions 110-1 (or a single set of contiguous light-emitting portions 110-3 as shown in FIG. 6), may sometimes be referred to as a Single Slit Arc Vertex Illuminators (Single SAVI). The illuminator 100-1 may be used as the illuminator 100 in FIG. 1 to illuminate the subject 20 whose image is to be captured by the camera 10. In particular, the illuminator 100-1 may be positioned relative to the subject 20 with the "flat" of the arc-shaped light-emitting portion 110-1 facing the subject 20 and with the arc-shaped light-emitting portion 110-1 facing the same direction as the first curve 24 of the subject 20 as described above. The illuminator 100-1 may represent one of the simplest iterations of the illuminator 100 insofar as there is only a single arc-shaped light-emitting portion 110-1 having a single radius of curvature R (taking the relevant curvature as that of the convex side 112-1 or concave side 113-1, for example). The arc-shaped light-emitting portion 110-1 may be composed of an array of light emitting diodes (LEDs) such as bi-color or RGBW LEDs or of tungsten halogen lights or other incandescent lights arranged in the shape of an arc or may be composed of neon or other gas-discharge lighting that may be formed in an arc shape, for example. The arc-shaped light-emitting portion 110-1 may be formed on one or more base plates 114-1 that define the plane 111. The base plate(s) 114-1 may have raised sidewalls 116-1 that define the boundary of the arc-shaped light-emitting portion 110-1 and may help to prevent unwanted side illumination that is not directed at the subject 20. Such sidewalls 116-1 may also be used to mount a diffuser lens 118, filter, or other transmissive substrate to be used with the arc-shaped light-emitting portion 110-1, which may be used to focus the light into a sheet of light or to diffuse the light as desired, or to apply color, for example. The sidewalls 116-1 may similarly be used to mount an opaque cover to be fitted over the arc-shaped light-emitting portion 110-1 when it is not in use.

The illuminator 100-1 may further include a control box 120-1 that houses an input interface 122-1 for controlling various settings of the illuminator 100-1 including, for example, power ON/OFF, intensity of light output by the arc-shaped light-emitting portion 110-1, color controls (e.g. color balance), etc. The control box 120-1 may be connected to the arc-shaped light-emitting portion 110-1 as shown, for example, by being bolted to the base plate(s) 114-1. The illuminator 100-1 may further include a mount 130-1 for mounting the one or more base plates 114-1 at a position relative to the subject 20 to be filmed or photographed. The mount 130-1 may comprise a bracket and one or more joints, for example, which may allow the illuminator 100-1 to swivel, rotate, translate, etc. relative to a fixed surface such as a table, wall, or floor stand. In the illustrated example, the mount 130-1 is connected to the control box 120-1, but the mount 130-1 may alternatively be connected directly to the base plate(s) 114-1 that support the arc-shaped light-emitting portion 110-1. The control box 120-1 may have both manual and industry standard digital multiplex (DMX) controls via cabling and/or wireless communication (e.g. Bluetooth, WiFi, etc.) as well as the ability to update with advances in technology. The illuminator 100-1 may be configured to operate on mains and/or battery power.

Figure 3:
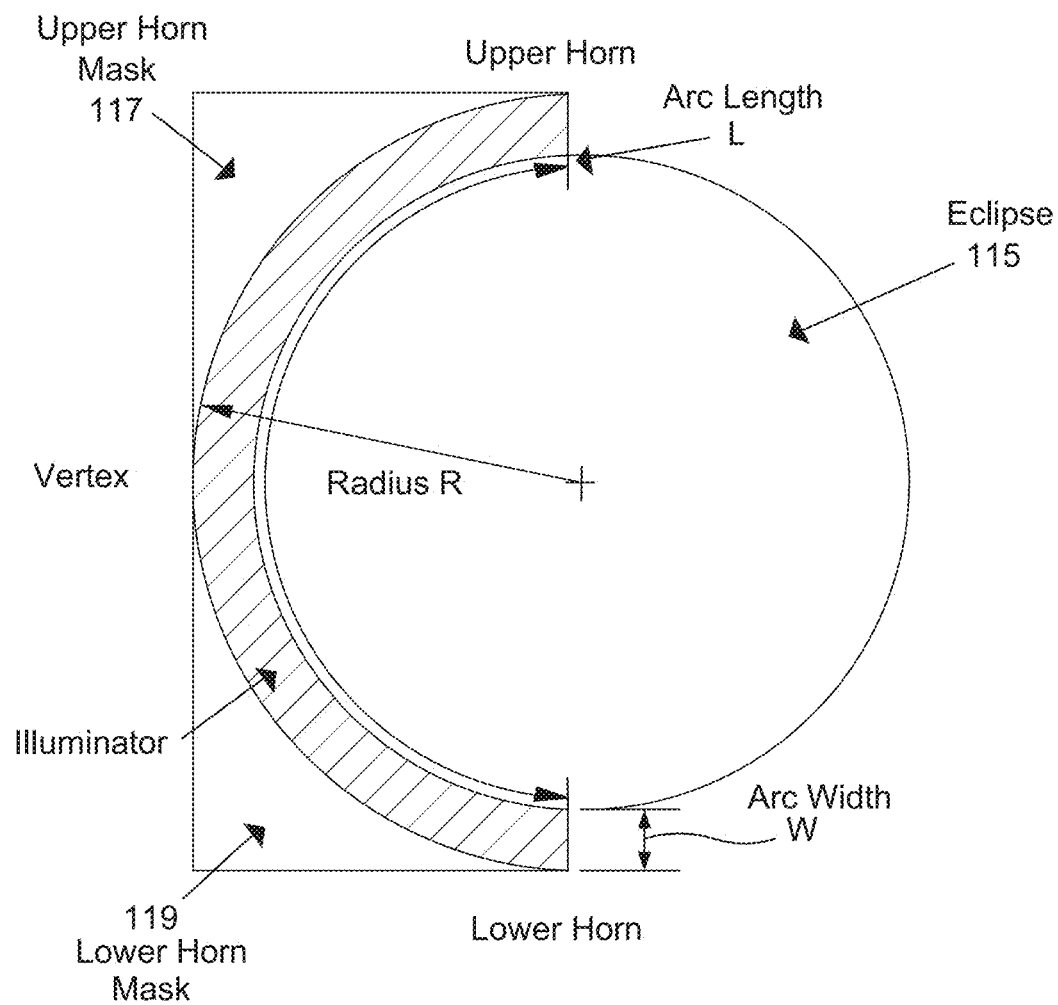
FIG. 3 is a diagram illustrating geometric parts of the illuminator of FIG. 2.

FIG. 3 is a diagram illustrating geometric parts of the illuminator 100-1. The arc defined in the plane 111 by the arc-shaped-light-emitting portion 110-1 may have dimensions as defined in FIG. 3 such as an arc length L and an arc width W, as well as the radius of curvature R mentioned above. As compared to a conventional light source such as a rectangular or round bounce board or umbrella, the arc-shaped light-emitting portion 110-1 of the illuminator 100-1 may define, by virtue of the negative space surrounding the arc in the plane 111, a non-luminous center area 115 or "eclipse" and two (e.g. upper and lower) non-luminous horn masks 117, 119. As described in greater detail below, the non-luminous center area 115 may help to control the position and size of specular highlights, while the horn masks 117, 119 may prevent distortion such as toroidal distortion that may occur when illuminating a spherical object at grazing angles with conventional light sources. While FIG. 3 depicts the illuminator 100-1 by way of example, the geometric parts defined in the diagram may be equally applicable to each arc-shaped-light emitting portion 110 of the illuminator 100 shown in FIG. 1, as well as to other embodiments described herein.

Figure 4:
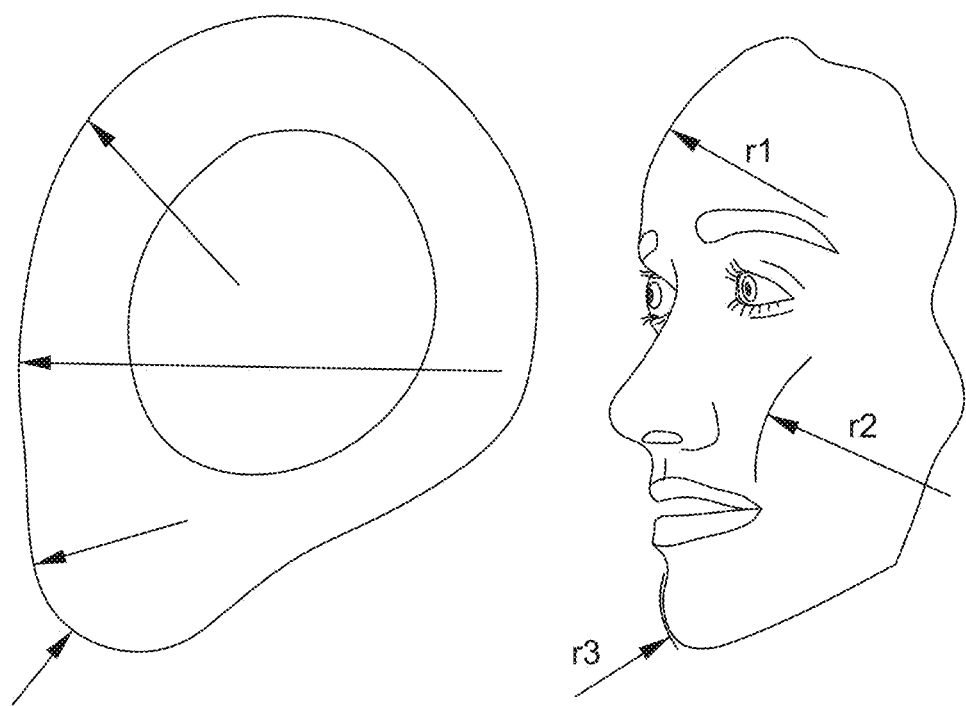
FIG. 4 is a diagram illustrating radii of curvature found in a human face.

FIG. 4 is a diagram illustrating radii of curvature found in a human face. As shown in the drawing on the right-hand side of FIG. 4, as well as in the abstraction on the left-hand side, a human face can be broken down into a series of radial curves $r_1$, $r_2$, $r_3$ with discrete radii. To achieve optimal illumination, those radial curves may be illuminated by arc-shaped light-emitting portions 110, 110-1 that face the same direction as described above, with especially advantageous results occurring when the arc-shaped light-emitting portions 110, 110-1 achieve parity with the curves (e.g., by approximately matching the radius of curvature within some threshold). Parity can be achieved via proximity, for example, with the illuminator 100, 100-1 being positioned at a distance from the subject 20 that achieves parity between the first arc-shaped light-emitting portion 110a, 110-1 and the first curve 22 of the subject 20. In achieving parity by proximity, consideration may be given to lune geometry, diminishing illumination semi-cone, angular diameter, etc. as discussed in greater detail below.

Figure 5:
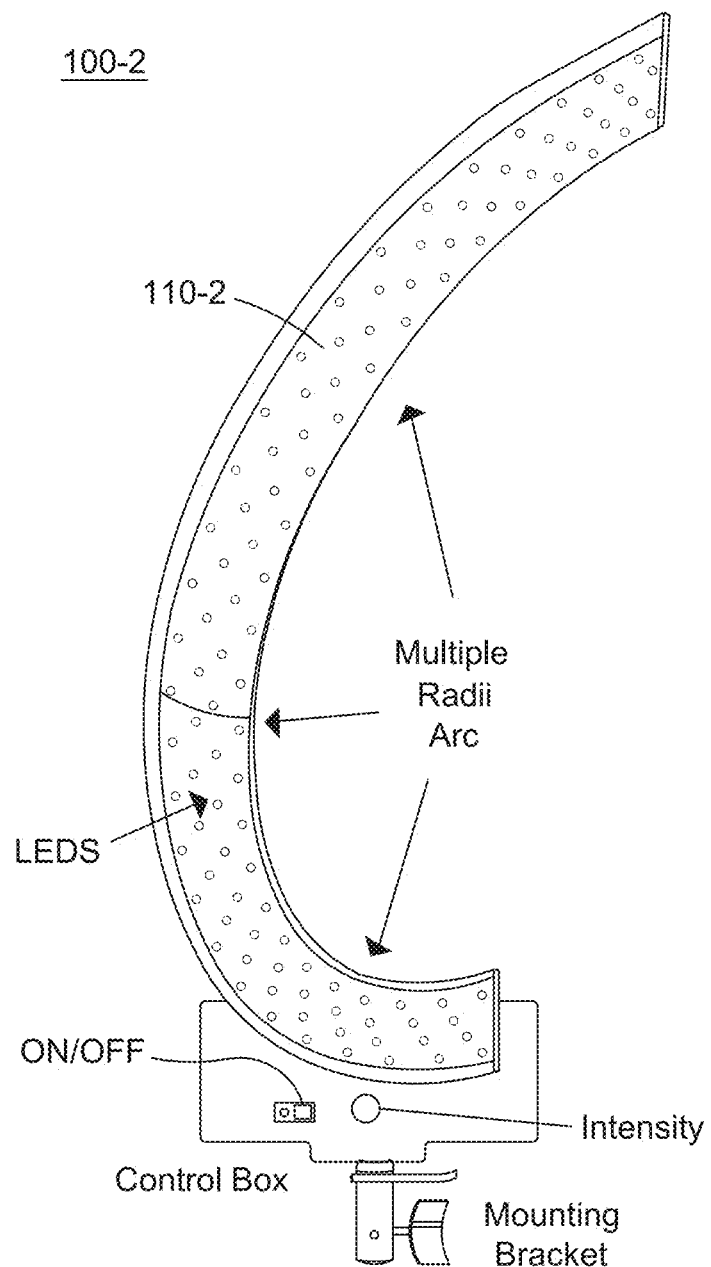
FIG. 5 shows an illuminator having a single arc-shaped light-emitting portion with multiple radii of curvature.

FIG. 5 shows an illuminator 100-2 having a single arc-shaped light-emitting portion 110-2 with multiple radii of curvature. The illuminator 100-2 may be the same as the illuminator 100-1 of FIG. 2 and may be used as the illuminator 100 in FIG. 1 to illuminate the subject 20 whose image is to be captured by the camera 10 (with the "flat" of the arc-shaped light-emitting portion 110-2 facing the subject 20), except as follows. Whereas the arc-shaped light-emitting portion 110-1 of the illuminator 100-1 shown in FIG. 2 has only a single radius of curvature R, the illuminator 100-2 may have multiple radii of curvature along its path to match multiple radial curves of different photographic subjects or different parts of the same subject as shown in FIG. 4 (e.g., the shape of the human forehead, cheeks, and chin). In the example of FIG. 5, the arc-shaped light-emitting portion 110-2 has an increased radius of curvature at an upper portion, which might be used to match the radial curve $r_1$ (see FIG. 4) defined by a subject's forehead, for example, and a decreased radius of curvature at a lower portion that might match the curve $r_3$ defined by the subject's chin, for example.

FIG. 6 shows an illuminator 100-3 having multiple contiguous arc-shaped light-emitting portions 110-3. The illuminator 100-3 may be the same as the illuminator 100-1 or 100-2 and may be used as the illuminator 100 in FIG. 1 to illuminate the subject 20 whose image is to be captured by the camera 10, except that the illuminator 100-3 may have a plurality of arc-shaped light-emitting portions 110-3 arranged contiguously (e.g., end-to-end) in the plane 111. Each additional arc-shaped light-emitting portion 110-3 may define an additional arc in the plane 111 that is offset relative to the arc defined by the first arc-shaped light-emitting portion 110-3. In the case of FIG. 6, the arcs defined by the second and third arc-shaped light-emitting portions 110-3 are contiguous with the arc defined by the first arc-shaped light-emitting portion 110-3. For example, a segmented base plate 114-3 or base plates 114-3 supporting the light-emitting portions 110-3 can be attached together with swivel bearings 140 or other predefined points of rotation that allow the orientation of the arc-shaped light-emitting portions 110-3 to be adjusted. In this way, multiple base plate segments 114-3 can be rotatably connected to each other, for example. When used as the illuminator 100 of FIG. 1, the "flat" of all of the arc-shaped light-emitting portions 110-3 may face the subject 20, and the illuminator 100-3 may be positioned relative to the subject 20 so that the multiple arc-shaped light-emitting portions 110-3 face the same direction as multiple curves 24 of the subject 20 (e.g., a first arc-shaped light-emitting portion 110-3 faces the same direction as a first curve 24, a second arc-shaped light-emitting portion 110-3 faces the same direction as a second curve, etc.). For example, the upper arc-shaped light-emitting portion 110-3, which has an increased radius of curvature, may be oriented to align with and match the radial curve $r_1$ (see FIG. 4) defined by a subject's forehead, while the lower arc-shaped light-emitting portion 11-3, which has a decreased radius of curvature, may be oriented to align with and match the curve $r_3$ defined by the subject's chin. The distance of the illuminator 100-3 to the subject 20 can be controlled to achieve parity with multiple curves of the subject 20 at the same time.

Figure 7:
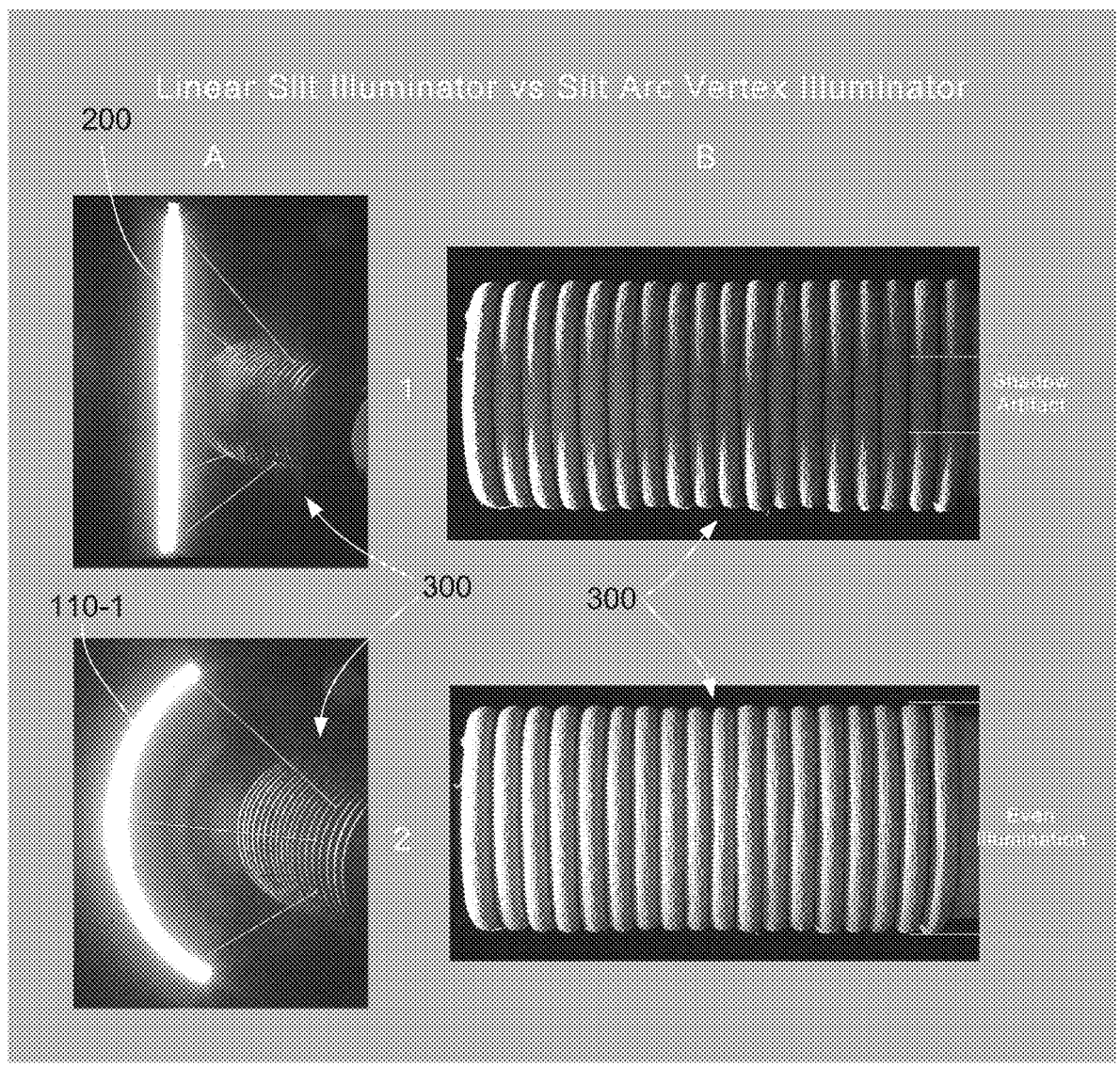
FIG. 7 shows a comparison between illuminating a plurality of curved objects with the arc-shaped light-emitting portion of the illuminator of FIG. 2 and illuminating the same plurality of curved objects with a linear slit illuminator.

FIG. 7 shows a comparison between illuminating a plurality of curved objects 300 with the arc-shaped light-emitting portion 110-1 of the illuminator 100-1 and illuminating the same plurality of curved objects 300 with a linear slit illuminator 200. In some sense, the disclosed illuminator 100, 100-1, 100-2, 100-3 may be thought of as a novel iteration of slit-light illuminators used by ophthalmologists to create a sheet of light for examining the complex structures of eyes. Slit light instruments offer different light qualities, from highly focused to Lambertian, depending on the needs of the examiner. When shined on an object, a slit Lambertian illuminator with thin Lambertian soft light provided on one axis will highlight the features of the object whose reliefs are parallel to the axis of the illuminator. In the case of lighting curved objects, this causes shadows that create distortions producing unfaithful renderings of those objects. As an example, consider the effect caused by lighting a row of curved objects 300 with a slight-light illuminator 200 as shown in the upper part of FIG. 7 (row 1). When arranged transverse to the row as shown on the left-hand side of FIG. 7 (column A), the linear illuminator 200 creates a shadow artifact at the apex of the curved objects 300 as shown on the right-hand side of FIG. 7 (column B). The ray tracings in row 1, column A show why this is. In particular, after the center part of the linear illuminator 200 is blocked by the vertex of the first curved object 300, each end of the illuminator 200 is still able to light up the "shoulder" of each subsequent curved object 300. This distorts the image because it has the effect of flattening the curves in the resulting image. This illustrates one of the main causes of distortion when using any straight-edged illuminator (not only a slit illuminator) to light a curved object 300.

When the linear illuminator 200 is arranged in the direction of the row (not shown), rather than transverse to it, the opposite distortion occurs. Namely, the central part of each curved object 300 has a broader illumination area than the ends. This distorts the geometry of the curved objects 300 and may create the illusion that the curves are sharper than they are, for example.

The lower part of FIG. 7 (row 2) illustrates the novel interaction between the disclosed illuminator 100, 100-1, 100-2, 100-3 and the same row of curved objects 300. As can be seen, the arc-shaped light-emitting portion 110-1 is able to illuminate the full radius of the curved objects 300 without distortion, as the curvature of the arc-shaped light-emitting portion 110-1 prevents unwanted highlighting of the "shoulder" of each subsequent curved object 300 relative to the preceding one. Equivalently, it can be said that the upper and lower horn masks 117, 119 defined by the negative space of the arc-shaped light-emitting portion 110-1 (see FIG. 3) prevent any illumination beyond the arc of the arc-shaped light-emitting portion 110-1. In this way, a unique lighting condition may exist when the respective curves defined by the arc-shaped light-emitting portion 110-1 and the curved objects 300 face the same direction and, in particular, when they reach parity, creating even illumination along the leading edges of the curves. Because of this, the outer edges of all radial curves appropriately lit by an illuminator 100, 100-1, 100-2, 100-3 will be highlighted, so that complex spheroids with convex and concave shapes such as the human face will be emphasized correctly without distortion, translating into a greater illusion of three-dimensionality in the captured image. This may result in the curved objects 300 being more faithfully rendered (and often accentuated and enhanced) relative to traditional lighting sources.

Figure 8:
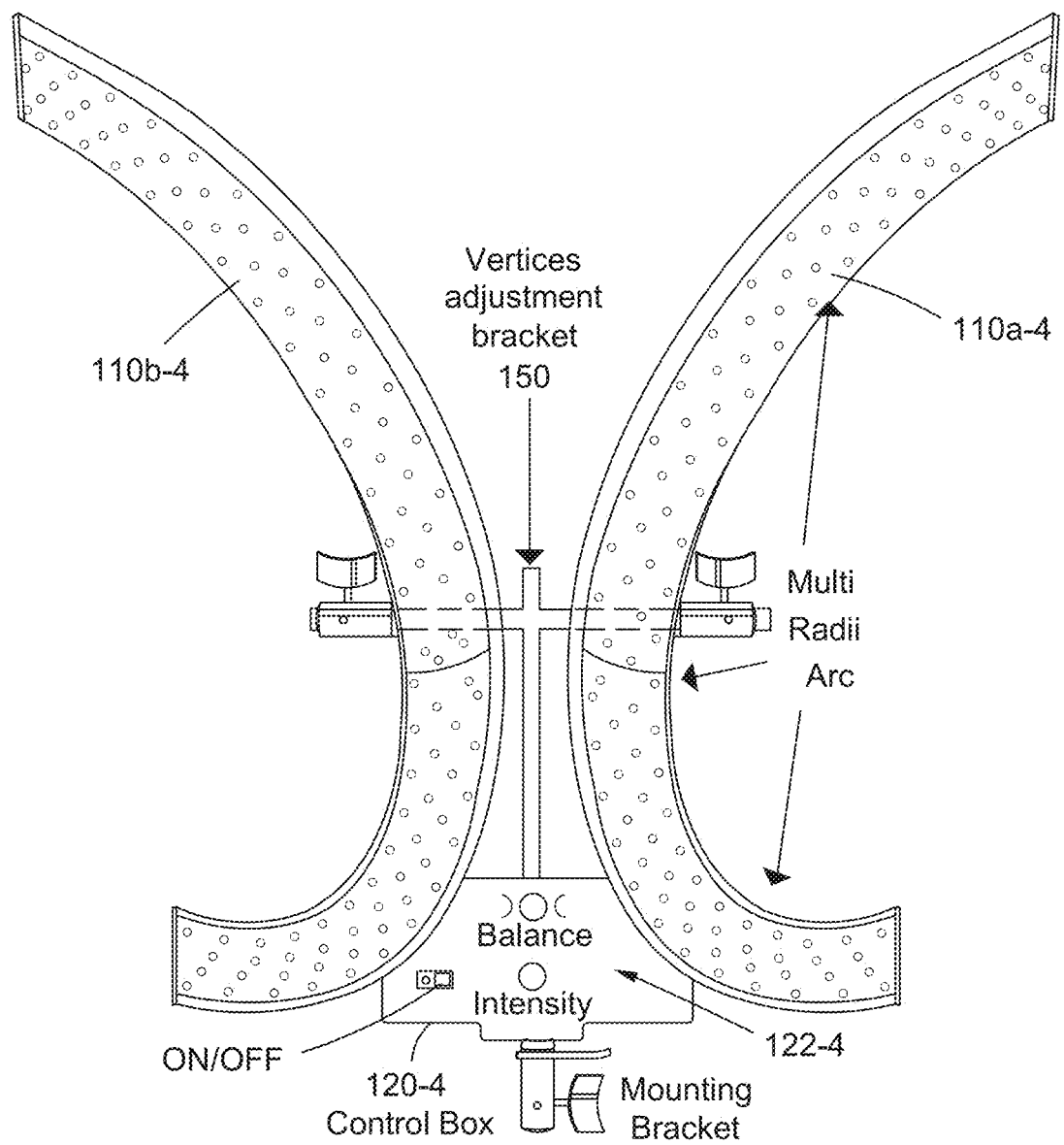
FIG. 8 shows an illuminator having multiple arc-shaped light-emitting portions arranged with convex sides facing each other.

FIG. 8 shows an illuminator 100-4 having multiple arc-shaped light-emitting portions 110a-4, 110b-4 arranged with convex sides 112a-4, 112b-4 facing each other. The illuminator 100-4 may be used as the illuminator 100 in FIG. 1 to illuminate the subject 20 whose image is to be captured by the camera 10. In particular, the illuminator 100-4 may be positioned relative to the subject 20 with the "flat" of the first arc-shaped light-emitting portion 110a-4 facing the subject 20 and with the first arc-shaped light-emitting portion 110a-4 facing the same direction as the first curve 24 of the subject 20 as described above. The illuminator 100-4 may be the same as the illuminator 100-2 shown in FIG. 5, with the first arc-shaped light-emitting portion 110a-4 defining an arc having multiple radii of curvature just like the arc-shaped light-emitting portion 110-2, except that the illuminator 100-4 may further include a second arc-shaped light-emitting portion 110b-4 defining another arc in the plane 111 that is offset relative to the arc defined by the first arc-shaped light-emitting portion 110a-4. The first and second arc-shaped light-emitting portions 110a-4, 110b-4 of FIG. 8 may be separate, rather than contiguous like the multiple arc-shaped light-emitting portions 110-3 described in relation to FIG. 6.

When used as the illuminator 100 in the arrangement shown in FIG. 1, the second arc-shaped light-emitting portion 110b-4 of FIG. 8 may be used as the second arc-shaped light-emitting portion 110b of FIG. 1. As such, the illuminator 100-4 may be positioned relative to the subject 20 so that the second arc-shaped light-emitting portion 110b-4 faces the opposite direction as the first curve 24 of the subject 20. More specifically, the second arc-shaped light-emitting portion 110b-4 and the first curve 24 may be regarded as facing in opposite directions as long as a majority of normal vectors of the first curve 24 have the opposite direction as at least one normal vector of the second arc-shaped light-emitting portion 110b-4 (with normal vectors defined to point toward the center of curvature, for example). Owing to such directional counter-alignment of the second arc-shaped light-emitting portion 110b-4 with the first curve 24, the second arc-shaped light-emitting portion 110b-4 may function as a fill light, while the first arc-shaped light-emitting portion 110a-4 functions as a key light, as described in more detail below.

Such a device as shown in FIG. 8, including multiple, separate light-emitting portions 110a-4, 110b-4, may sometimes be referred to as a Dual Slit Arc Vertex Illuminators (Dual SAVI). When more than one separate arc-shaped light-emitting portion 110a-4, 110b-4 is incorporated into a single lighting unit (e.g. illuminator 100-4), the convex sides 112a-4, 112b-4 can be oriented to face each other using, for example, a vertices adjustment bracket 150 as shown in FIG. 8. The vertices adjustment bracket 150 may include one or more joints, for example, which may allow the arc-shaped light-emitting portions 110a-4, 110b-4 to swivel, rotate, translate, etc. relative to each other and/or to the control box 120-4.

The control box 120-4 of the illuminator 100-4 may be the same as the control box 120-1 described above in relation to FIG. 2 and may include an input interface 122-4 having the same features as the input interface 122-1 of FIG. 2. However, in the case of the control box 120-4, which may be for controlling multiple arc-shaped light-emitting portions 110-4 as described above, the input interface 122-4 may additionally include balance control for controlling a relative intensity of light emitted by the first and second arc-shaped light-emitting portions 110a-4, 110b-4. With the balance control having been set, a user may adjust an intensity control of the input interface 122-4 to control an overall intensity of light emitted by the first and second arc-shaped light-emitting portions 110a-4, 110b-4 while the relative intensity remains constant. By the same token, the user may first adjust the overall intensity and then adjust the balance while the overall intensity remains constant. In this way, a central controller may be programmable to allow for the fading up and down of the intensity of individual arc-shaped light-emitting portions 110a-4, 110b-4 while maintaining the overall light intensity (lumens) striking the subject.

Figure 9:
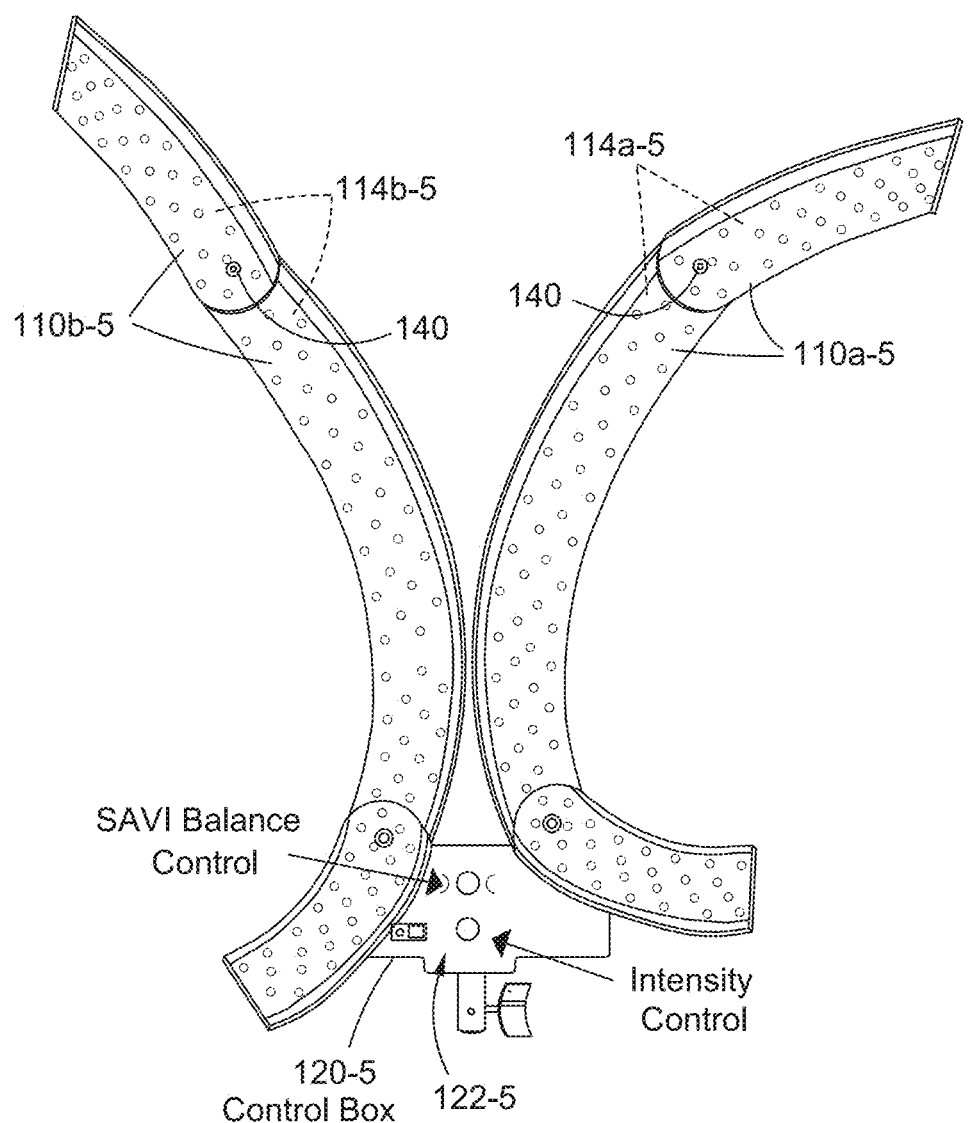
FIG. 9 shows an illuminator having a first set of contiguous arc-shaped light-emitting portions facing a second set of contiguous arc-shaped light-emitting portions.

FIG. 9 shows an illuminator 100-5 having a first set of contiguous arc-shaped light-emitting portions 110a-5 facing a second set of contiguous arc-shaped light-emitting portions 110b-5. The illuminator 100-5 may be another example of a Dual SAVI as described above in relation to FIG. 8 and may include all of the features of the illuminator 100-4 except as follows. Whereas the illuminator 100-4 includes a single first arc-shaped light-emitting portion 110a-4 facing a single second arc-shaped light-emitting portion 110b-4 (though they each may have multiple radii of curvature as shown in FIG. 8), the illuminator 100-5 of FIG. 9 instead has two sets of contiguous arc-shaped light-emitting portions 110a-5, 110b-5. Each set of contiguous arc-shaped light-emitting portions 110a-5, 110b-5 may be the same as the set of arc-shaped light-emitting portions 110-3 described in relation to FIG. 6, with the individual base plates 114a-5, 114b-5 (segments) being attached to one another by swivel bearings 140, for example. In this way, the illuminator 100-5 may combine the Dual SAVI key light and fill light functionality of the illuminator 100-4 (described in more detail below) with the adjustable arcs functionality of the illuminator 100-3. While not depicted in FIG. 9, the illuminator 100-5 may additionally include the vertices adjustment bracket 150 described in relation to FIG. 8 for increased adjustability. The illuminator 100-5 may be used as the illuminator 100 in FIG. 1 in the same way as the illuminator 100-4, but with the increased functionality of being able to more finely adjust the arc-shaped light-emitting portions 110a-5, 110b-5 to achieve parity with the curves 24, etc. of the subject 20. This is especially helpful when illuminating a set of radial curves with different radii such as found on complex spheroidal objects like human faces (see FIG. 4). The geometry of the arc-shaped light-emitting portions 110a-5, 110b-5 may be based on achieving parity with radial curves of a typical human face, as this increases the unique lighting effects of the illuminator 100-5.

The control box 120-5 of the illuminator 100-5 may be the same as the control box 120-4 described above in relation to FIG. 8 and may include an input interface 122-5 having the same features as the input interface 122-4 of FIG. 8. In addition to the controls discussed above, the input interface 122-5 may also allow control of individual contiguous segments of the SAVI unit, that is, individual arc-shaped light-emitting portions 110a-5 of the same contiguous set and individual arc-shaped light-emitting portions 110b-5 of the same contiguous set. For instance, it may be desirable to increase the intensity of the luminance on the top portion of a set of arc-shaped light-emitting portions 110a-5 to emphasize a feature (e.g., forehead) on the photographic subject 20 such as a human face. Individual control of each segment in this way may also be included in the single-sided illuminator 100-3 shown in FIG. 6.

Figure 10:
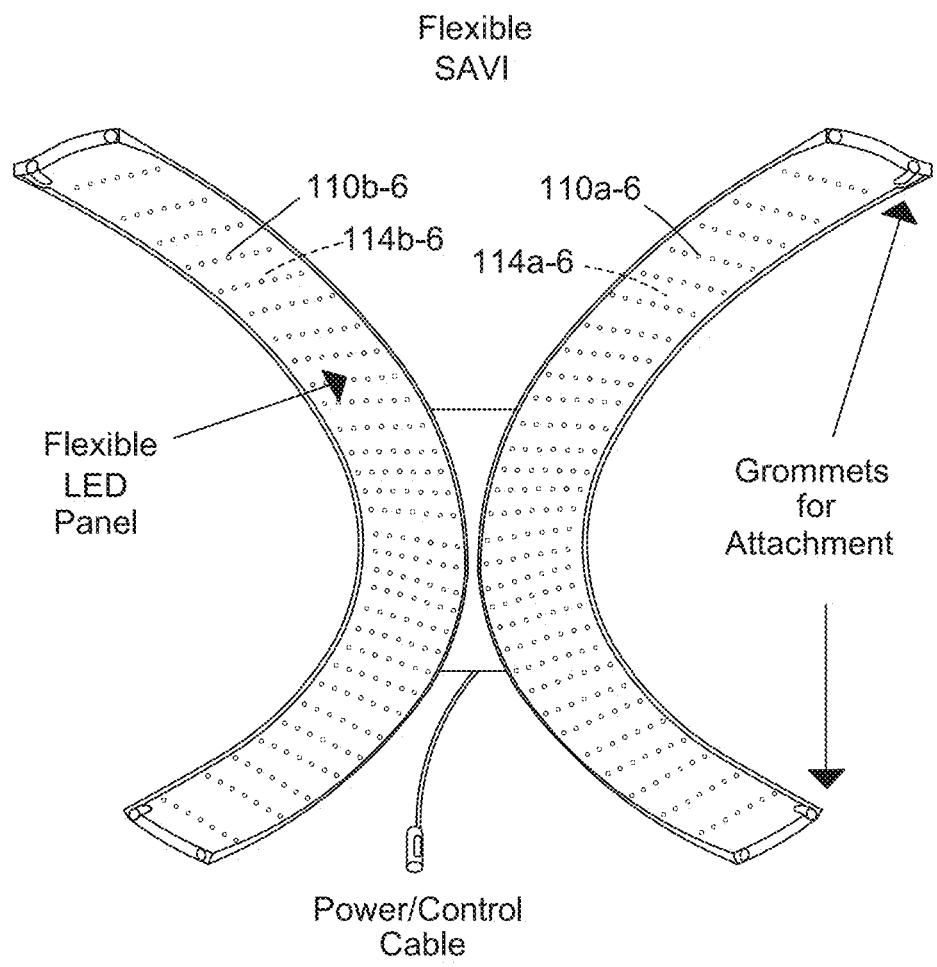
FIG. 10 shows an illuminator having flexible arc-shaped light-emitting portions.

FIG. 10 shows an illuminator 100-6 having flexible arc-shaped light-emitting portions 110a-6, 110b-6. The illuminator 100-6 may be used as the illuminator 100 in the arrangement of FIG. 1 with the first and second arc-shaped light-emitting portions 110a-6, 110b-6 serving as the first and second arc-shaped light-emitting portions 110a, 110b, respectively. The illuminator 100-6 may be the same as the illuminator 100-5 except that, instead of there being contiguous sets of arc-shaped light-emitting portions 110a-5, 110b-5 (e.g., connected by swivel bearings 140), there may be only a single arc-shaped light-emitting portion 110a-6 and a single arc-shaped light-emitting portion 110b-6 that are built on flexible base plates 114a-6, 114b-6 that allow the arc-shaped light-emitting portions 110a-6, 110b-6 to be freely deformed to define arcs in the plane 111 as desired for a given application. In this way as well, multiple base plate "segments" arbitrarily defined along a single flexible base plate 114-6 or 114b-6 can be rotatably connected to each other. The flexible base plates 114a-6, 114b-6 may be made of a textile or flexible plastic, for example. The arc-shaped light-emitting portions 110a-6, 110b-6 can be held in the desired shapes and positions by means of attachment points such as grommets formed in the flexible base plates 114a-6, 114b-6. Such attachment points may be used to secure the arc-shaped light-emitting portions 110a-6, 110b-6 to a frame or stand using wire or thread, for example. Alternatively, it is contemplated that the arc-shaped light-emitting portions 110a-6, 110b-6 may be made of or include a material that automatically holds its shape, such as a metal wire or a shape-memory polymer that only returns to its relaxed state when a specified stimulus is applied such as being heated to a particular temperature or exposed to a particular light. While schematically depicted in FIG. 10 with only a simple power/control cable (which may be used to connect to an external control box, for example), the illuminator 100-6 may further include a control box with the same functionality as the control box 120-4. The illuminator 100-6 may likewise include the vertices adjustment bracket 150 described in relation to FIG. 8 for increased adjustability.

The disclosure is not intended to be limited to the above examples of the illuminators 100 (including the illuminators 100-1, 100-2, 100-3, 100-4, 100-5, and 100-6), which are only included to show a range of features that can be implemented, in various combination with one another. For example, while not specifically depicted, it is contemplated that a Dual SAVI having opposing light-emitting portions 110a, 110b, like the Dual SAVIs shown in FIG. 8-10, may be constructed using single-radius arcs as in the example of the illuminator 110-1 shown in FIG. 2. As another example, an illuminator may be constructed having only a single flexible arc-shaped light-emitting portion 110a-6. Even more generally, it is contemplated that one or more programmable lighting panels (e.g., RGBW LED panels) could be used as the illuminator 100, with the shape of the arc-shaped light-emitting portion(s) 110 being defined and adjusted by image mapping via a panel controller. For example, the illuminator may comprise an array of light-emitting diodes, with the arc-shaped light-emitting portion (s) being an illuminated subset(s) thereof. The array of light-emitting diodes may include an unilluminated subset on a concave side of the arc-shaped light-emitting portion(s) (corresponding to the eclipse 115 of FIG. 3) and one or more unilluminated subsets on a convex side of the arc-shaped light-emitting portion(s) (corresponding to the horn masks 177, 119). Conversely, opaque masks can be applied to the surface of ordinarily shaped (e.g., rectangular or circular) soft lights or other lensed or open-face lighting instruments in order to create the geometry of one or more arc-shaped light-emitting portion(s) 110. All such possibilities, and combinations thereof, are intended to be included within the disclosed embodiments.

Figure 11:
FIG. 11 shows example arrangements of single and multiple arc-shaped light-emitting portions that may be used with the disclosed illuminators.
Figure 11:
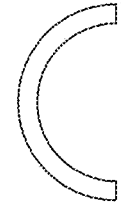
Figure 11:
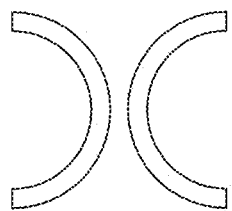
Figure 11:
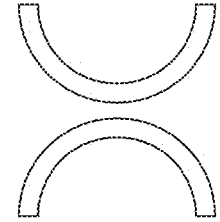
Figure 11:
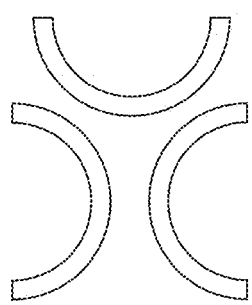
Figure 11:
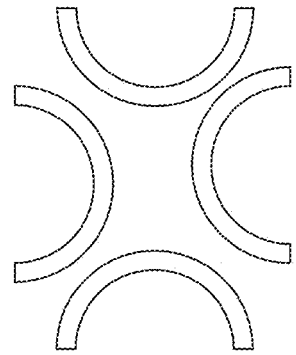

FIG. 11 shows example arrangements of single and multiple arc-shaped light-emitting portions 110 that may be used with the disclosed illuminators 100 (including illuminators 100-1, etc.). As can be seen, the number of arc-shaped light-emitting portions 110 (or sets of contiguous arc-shaped light-emitting portions 110) is not limited to one or two, nor is the arrangement limited to left and right. For example, illuminators 100 with three or more arc-shaped light-emitting portions 110 may be used for fine tuning the curves on a given photographic subject 20. In FIG. 11, six example configurations are shown, illustrating that Single SAVIs can be oriented in any orientation (left and right shown) in a 360-degree range and that Dual SAVIs can also be rotated into any angle (vertical and horizontal side by side views shown). Example configurations using three and four arc-shaped light-emitting portions 110 are shown as well. These examples are only suggestions of possible SAVI setups and do not limit the range of possible arrangements. For purposes of photography, the illustrated Single SAVI setups and Dual SAVI Side by Side Horizontal setup may be particularly useful as described in more detail below.

Referring back to FIG. 1, the exemplary illuminator 100 is arranged in a Dual SAVI setup including a camera 10 and object 20 as might be found on a photographic shoot. The subject 20 may be a portion or the entirety of a person or other subject to be captured, for example, a photographic subject's face. In this arrangement, the arc-shaped light-emitting portions 110a, 110b function as a key light and a fill light, respectively, and are thus labeled in FIG. 1 as the "Key SAVI" and the "Fill SAVI," borrowing the standard usage of these terms in the illumination of photographic subjects. Physically, the Key SAVI may be placed at a desired key light placement relative to the camera 10, such as at 45 degrees to the side of the subject or another angle, depending on the desired effect. For example, the placement of a vertex of the Key SAVI (e.g., a point along or near the convex side 112a of the first arc-shaped light-emitting portion 110a) may define a "relative vertex angle" in relation to the camera 10, with the first arc-shaped light-emitting portion 110a itself (or a majority thereof) being placed outside that angle as shown. In the illustrated example, a vertex of the Fill SAVI (e.g., a point along or near the convex side 112b of the second arc-shaped light-emitting portion 110b) also falls on or near the "relative vertex angle," but with the second arc-shaped light-emitting portion 110b placed between the relative vertex angle and the normal angle defined by the camera 10, i.e., within the relative vertex angle. As noted above, the illuminator 100 may be positioned relative to the subject 20 so that a line 22 extending from the first arc-shaped light-emitting portion 110a to the subject 20 is orthogonal to the plane 111, that is, with the "flat" of the first arc-shaped light-emitting portion 110a facing the subject 20. When using a Dual SAVI setup in which the arc-shaped light-emitting portions 110a, 110b function as a Key SAVI and Fill SAVI, the illuminator 100 may be positioned relative to the camera 10 so that the second arc-shaped light-emitting portion 110b is defined between the line 22 extending from the first arc-shaped light-emitting portion 110a to the subject 20 and a line extending from the camera 10 the subject 20. It is also contemplated however, that the Fill SAVI may be positioned elsewhere, such as on the opposite side of the camera 10 relative to the Key SAVI.

Figure 12:
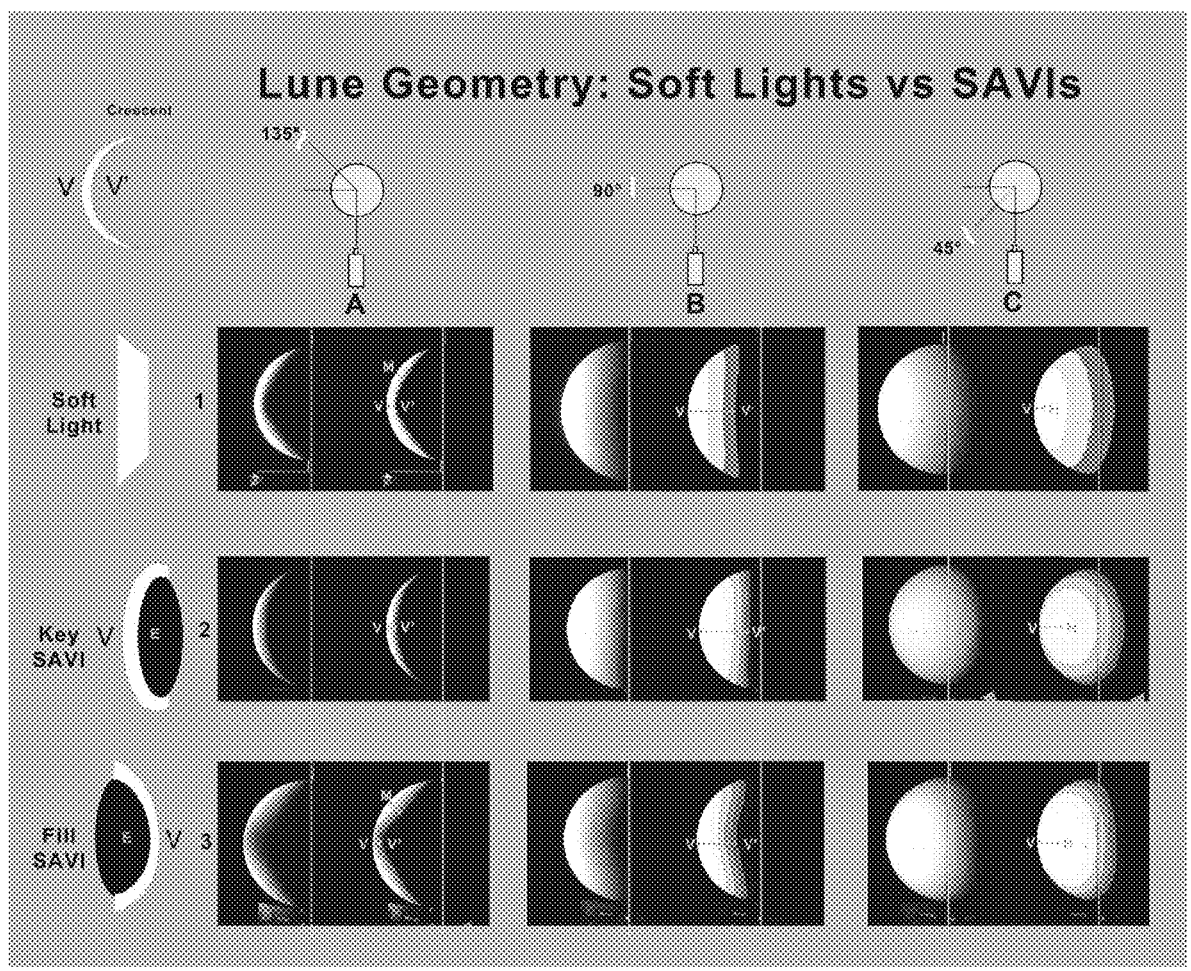
FIG. 12 shows a comparison between using arc-shaped light-emitting portions of the disclosed illuminators and using a rectangular light source when illuminating a sphere.

FIG. 12 shows a comparison between using an arc-shaped light-emitting portion 110 of the disclosed illuminators 100 (including 100-1, etc.) and using a rectangular light source when illuminating a sphere. The rectangular light source (row 1) is a traditional 10 cm×10 cm Lambertian soft light source and is positioned at 135 degrees (column A), 90 degrees (column B), and 45 degrees (column C) relative to the camera, which is set at 0 degrees relative to the sphere. The sphere has a diameter of 10 cm. The arc-shaped light-emitting portion 110 is a 5 cm radius SAVI and is oriented as a Key SAVI (row 2) and then as a Fill SAVI (row 3) as described above in relation to FIG. 1. However, in the example of FIG. 12, the Key SAVI and Fill SAVI are not positioned on either side of the relative vertex angle as described above in relation to the arc-shaped light-emitting portions 110a, 110b of FIG. 1 and are instead simply centered at the same position as the rectangular light source. In this way, FIG. 12 illustrates the effects due only to the SAVI's orientation and shape, rather than its placement in the context of a Dual SAVI (which is described in more detail below). The photographs shown in columns A, B and C show a progression of the proximity of the illuminators from behind the sphere (135°), to the side of the sphere (90°), to the front of the sphere (45°).

In column A, row 1, the soft light is backlighting the sphere from a 135-degree angle. There is a distortion where the vertex width is narrow (distance between V and V') as shown on the right "posterized" image. In a perfect crescent, the vertex would be the widest point of illumination as illustrated in the top-left corner of FIG. 12, yet in this example the area of the crescent "M" is greater, creating "toroidal" distortion.

In column A, row 2 the Key SAVI also illuminates from 135 degrees behind the sphere. However, in the case of the Key SAVI, there is a faithful rendering of a crescent shape such as that seen with a light source edge-lighting a sphere (like a crescent moon). Since the arc of the Key SAVI and the curve of the sphere face the same direction and are at parity, there are no corners on the light source to wrap around the sphere as there are in the case of the rectangular light source. As a result, the crescent is not distorted. The posterized image on the right side shows how evenly the illumination boundaries are distributed, resulting in an accurate rendering of the edge-lit sphere. Thus, as can be seen, the horn masks 117, 119 defined by the shape of the Key SAVI (see FIG. 3) may prevent the toroidal distortion that occurs when illuminating a spherical object at grazing angles with conventional light sources.

In column A, row 3, the Fill SAVI illuminates from 135 degrees behind the sphere. In this image, there is similar, but even more pronounced, distortion as that associated with a square-cornered illuminator (as in column A, row 1). The vertex width (V to V') is significantly narrower than the top and bottom part of the crescent (area "M"). As demonstrated by this example, traditional lighting artifacts may be reproduced as needed by appropriate orientation of a SAVI (or by including multiple SAVIs in the same unit at different orientations as in a Dual SAVI).

In column B, the illuminators have been moved to a 90-degree angle from the sphere (relative to the camera). Row 1 shows the illumination of the sphere by the square Lambertian illuminator. In theory, the sphere should resemble a half moon, but again, because of the shape of the illuminator, there is a vertex artifact where the highlighted area of the sphere dips away from the center of the sphere (V and V' on the right image). This creates a distortion where the sphere shape takes on the appearance of a toroid. In addition, there is an exaggerated bright area of illumination centrally ("hot spot") which tends to flatten the side of the sphere. This is very clear on the posterized image on the right. This is a common artifact with human faces when lit with a non-SAVI key light source because, unlike the disclosed illuminators that include an eclipse 115 (see FIG. 3), conventional light sources do not have a shadow element built into the design.

Column B, row 2 shows a Key SAVI at 90 degrees to the sphere. Because the arc of the Key SAVI and the curve of the sphere face the same direction and are at parity, there is an even line of illumination at the midpoint of the sphere (like a half moon). Again, due to the horn masks 117, 119 defined by the shape of the Key SAVI (see FIG. 3), the sphere does not appear to dip away from the center of the sphere (V and V' on the right image) and the toroidal distortion can be prevented. Moreover, because the arc of the SAVI defines the non-luminous center area referred to above as an eclipse 115 (see FIG. 3), the "hot spot" of highlights (including specular highlights) is diminished. The posterized version on the right shows an even distribution of illumination boundaries with a faithful rendering of a spheroid shape. In this way, the non-luminous center area 115 may help to control the position and size of specular highlights. This effect is further described in relation to FIGS. 27A, 27B, and 28, below.

Column B, row 3 shows the fill SAVI illuminating the sphere at 90 degrees to the sphere. The toroidal distortion is more pronounced than the flat soft light and can be used as an effect if desired. To this end, unlike the static effect seen with the non-SAVI illuminator in column B, row 1, the Fill SAVI illumination intensity can be adjusted to modulate the distortion effect. In a Dual SAVI arrangement as shown in FIG. 1 and described in more detail below, the Fill SAVI may thus be used for contour control.

Column C, row 1 shows the conventional soft light at a 45-degree angle to the sphere, illuminating the left face of the sphere. Because of the geometry of the soft light, the center of the highlight area (H) is very close to the edge of the sphere and the distance from "V" to "H" is short. The poles of the sphere are falling off into shadow, preventing an even illumination boundary.

Column C, row 2 is the Key SAVI at a 45-degree angle to the sphere, illuminating the left face of the sphere. Because the arc of the Key SAVI and the curve of the sphere face the same direction and are at parity, the lighting boundary follows a pole-to-pole curve as might be seen in a waning or waxing moon. Also, the dark area inside the arc of the SAVI (eclipse 115 in FIG. 3) prevents the highlight area from blocking up near the edge of the sphere and moves the highlights a distance into the illuminated face (distance between "V" and "H"). This corrects the limitations that other lighting shapes have when photographing spherical objects such as human heads and creates a more accurate rendering of the shape of the photographed object. In this way, the non-luminous center area 115 may help to control the position and size of specular highlights as noted above. In particular, the novel shape of the SAVI eclipse area 115 may prevent highlights (including specular highlights) on spherical objects from shifting toward the light source.

In column C, row 3 the Fill SAVI is at a 45-degree angle to the sphere, illuminating the left face of the sphere. The distance from the vertex to the center of the highlight area ("V" to "H") has moved even farther from the edge of the sphere, offering a wider highlight area than would be expected from a traditional Lambertian fill light shape.

In the context of photographing the human face, when the highpoint of a spheroidal shape such as the human cheek is illuminated from the upper and lower corners of a rectangular light source as in FIG. 12, column A, row 1 (that is, when there are no horn masks 117, 119 as depicted in FIG. 3), there is diminished illumination at the highpoint of the spheroid (cheek), which minimizes the convex shape of the cheek. The geometry of the Key SAVI's arc shape and parity with radial curves on a face avoids this distortion seen with a traditional soft light.

Figure 13:
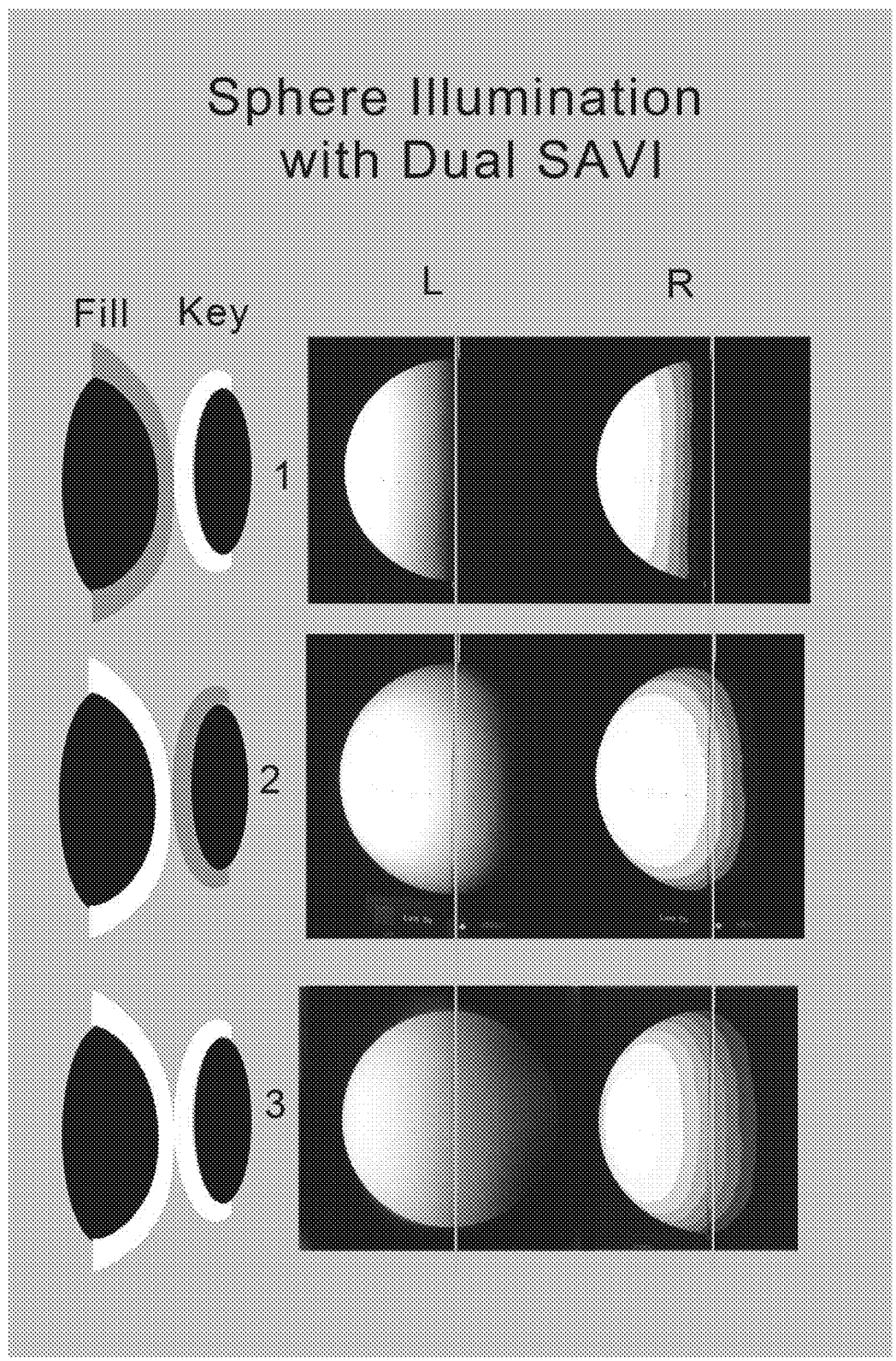
FIG. 13 shows a comparison between using differently oriented arc-shaped light-emitting portions of the disclosed illuminators when illuminating a sphere.

FIG. 13 shows a comparison between using differently oriented arc-shaped light-emitting portions 110 of the disclosed illuminators 100 (including 100-1, etc.) when illuminating a sphere. As shown, a Dual (Key and Fill) SAVI is arranged as in FIG. 1 with the vertices touching (or nearly touching) at a 90-degree angle relative to the camera. This time, the arc-shaped light-emitting portions 110 are arranged as a Dual SAVI as described above in relation to FIG. 1, with the relative vertex angle at 90 degrees. Row 1 shows illumination from only the Key SAVI on a sphere. Row 2 shows illumination from only the Fill SAVI where the illumination casts fill light on the sphere. Row 3 shows a combination of both SAVI illuminators and creates a desired rendering of the sphere.

In practice, the illumination intensity of the Key and Fill SAVIs can be separately modulated to adjust the contrast and control shadows and apparent contours of the sphere. This modulation has a dramatic effect on the rendering of the sphere, creating the illusion that the sphere is changing shape to become either thinner or flatter as captured by the camera. This effect works on all objects illuminated by a lighting fixture with two or more SAVIs, especially curved objects. The effect is especially useful in human portrait photography where radical and instant control of the rendering of facial curves may be desirable and is not possible with traditional lighting fixtures.

Figure 14:
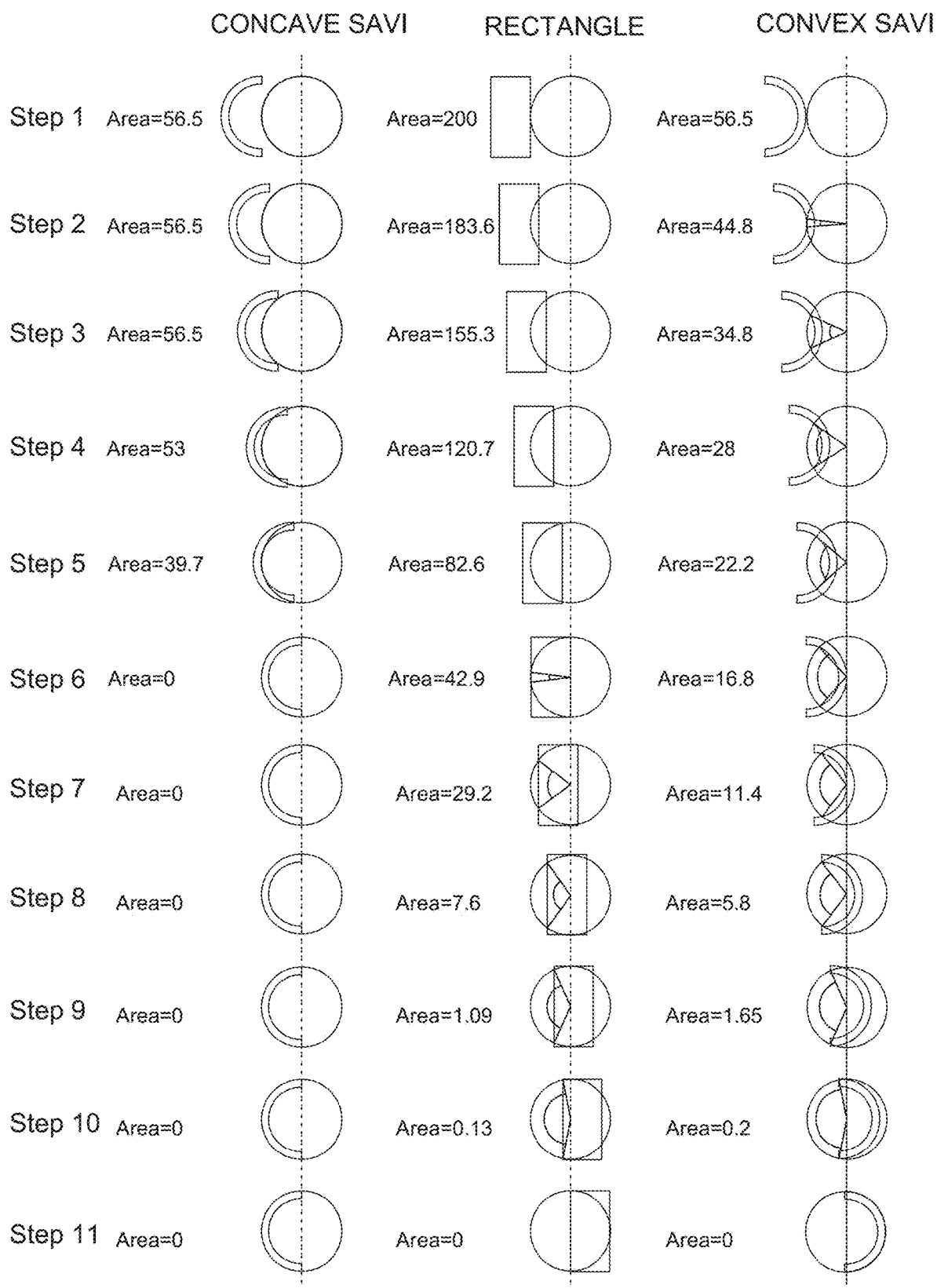
FIG. 14 is a diagram illustrating interactions between differently shaped light sources and a sphere at a plurality of relative positions.

FIG. 14 is a diagram illustrating interactions between differently shaped light sources and a sphere at a plurality of relative positions. Another benefit of SAVIs, as exemplified by the illuminators 100 described herein (including illuminators 100-1, etc.), is their proximity-dependent enhanced dynamic illumination as compared to traditional photographic lights, whereby SAVIs may profoundly affect the convex, concave, straight and irregular shapes and edges on photographic subjects. With reference to FIG. 14, SAVI illumination effects can be described in terms of lune geometry, where the interaction of crescent shapes with spheres and curves creates novel, dynamic illumination changes on the objects illuminated by this shape.

More specifically, FIG. 14 illustrates the difference between a Lambertian concave (key) arc, a convex (fill) arc and a rectangle illuminator all sharing the same scale of size by moving them behind a circle (representing a sphere) and measuring the surface area (SA) of illumination still available. This SA is directly proportional to the intensity of the light as produced by a Lambertian illuminator, and the interaction between the arc/crescent shapes and the circle may represent how the disclosed arc-shaped light-emitting portions 110 (including arc-shaped light-emitting portions 110-1, etc.) or SAVIs interact with the edges of curved objects. As explained above in relation to FIG. 3, one of the differences between a SAVI and a traditional Lambertian illuminator is the eclipse area 115 along with the upper and lower horn masking areas 117, 119. This means that a SAVI that fits within the boundaries of the outer dimensions of a traditional illuminator would have less overall SA given the masking areas. Thus, although the scale of the three illuminators in FIG. 14 is the same, their different geometries may result in different intensities of emitted light. Namely, the rectangle emits photons over its entire surface, but each of the arcs will fit inside the 10 cm×20 cm rectangle offering less SA. It is contemplated that the SA difference could be offset by a more powerful illuminator array than in the conventional rectangular illuminator, making them equal in overall light intensity. For purposes of illustrating how the geometry of each illuminator (irrespective of the overall SA) affects the interaction with the circle, the data of FIG. 14 is expressed as a percentage of total SA of each illuminator, thus gauging the relative changes to illumination intensity as each illuminator moves behind a sphere.

In step one of FIG. 14, all three illuminators are outside the circle with the arcs having a visible SA of 56.54 cm$^2$ and the rectangle of 200 cm$^2$. In each progressive step the illuminators are moved 2 cm to the right, causing them to slide behind the circle and reducing their visible SA as noted in FIG. 14. Table 1, below, shows the SA and % SA of each illuminator through the eleven 2 cm steps of the progression of the illuminators behind the circle.

TABLE 1

| | Concave (Key) SAVI | | Rectangle | | Convex (Fill) SAVI | |
|---|---|---|---|---|---|---|
| STEP | Visible SA (cm$^2$) | Visible SA (%) | Visible SA (cm$^2$) | Visible SA (%) | Visible SA (cm$^2$) | Visible SA (%) |
| 1 | 56.548668 | 100 | 200.000000 | 100 | 56.548668 | 100 |
| 2 | 56.548668 | 100 | 183.649889 | 91 | 44.8 | 80 |
| 3 | 56.548668 | 100 | 155.2704778 | 78 | 34.8 | 62 |

TABLE 1-continued

| | Concave (Key) SAVI | | Rectangle | | Convex (Fill) SAVI | |
|---|---|---|---|---|---|---|
| STEP | Visible SA (cm$^2$) | Visible SA (%) | Visible SA (cm$^2$) | Visible SA (%) | Visible SA (cm$^2$) | Visible SA (%) |
| 4 | 53.00 | 94 | 120.732657 | 60 | 28.0 | 50 |
| 5 | 39.731710 | 69 | 82.652077 | 41 | 22.24 | 39 |
| 6 | 0 | 0 | 42.920367 | 21 | 16.88 | 28 |
| 7 | 0 | 0 | 19.2 | 9 | 11.4 | 19 |
| 8 | 0 | 0 | 7.6 | 3.8 | 5.8 | 10 |
| 9 | 0 | 0 | 1.093855 | 0.5 | 1.65 | 2.8 |
| 10 | 0 | 0 | 0.134145 | 0.05 | 0.2 | 1 |
| 11 | 0 | 0 | 0 | 0 | 0 | 0 |

Figure 15:
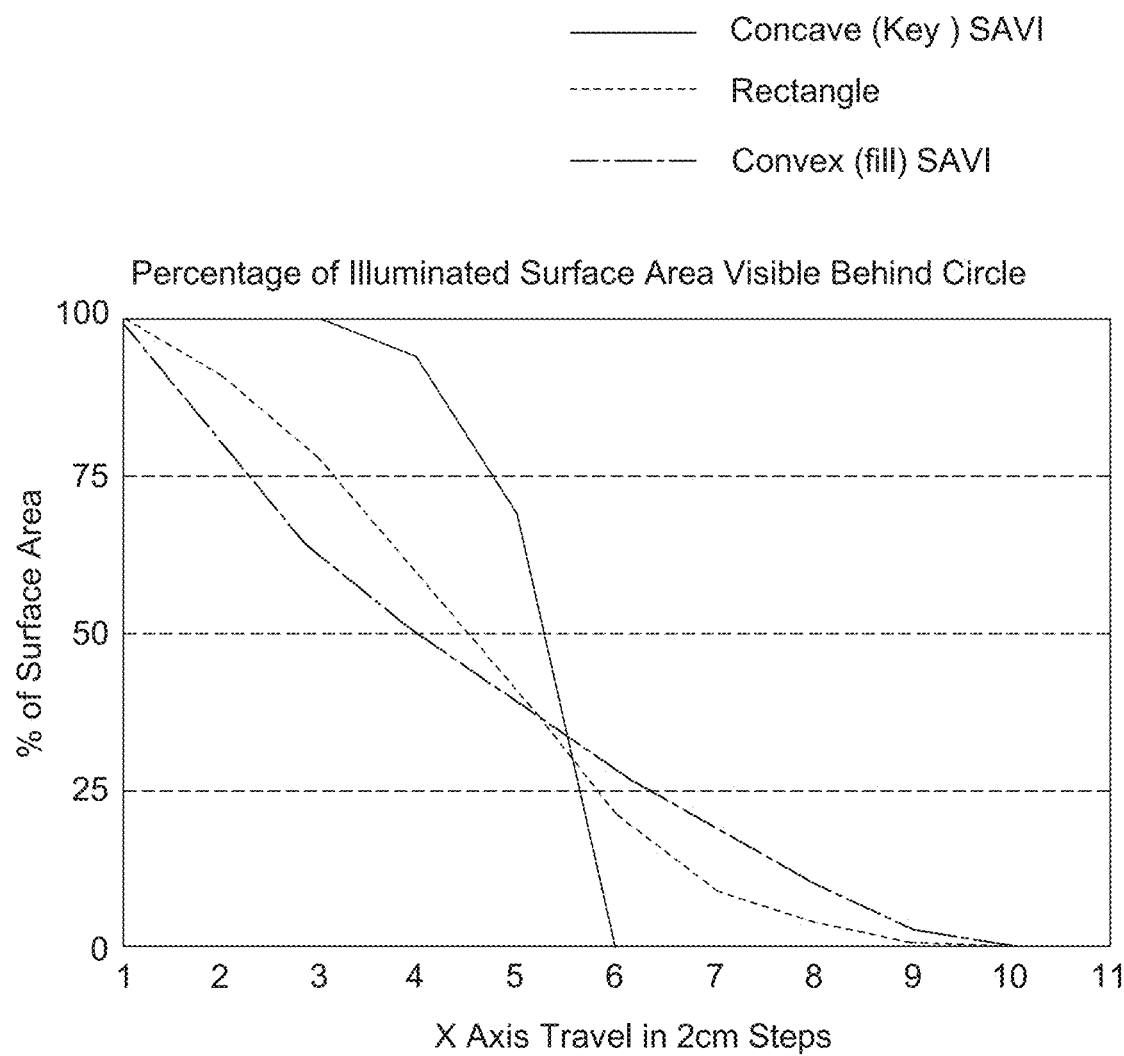
FIG. 15 is a graphical representation of data quantifying the interactions illustrated in FIG. 14.

FIG. 15 is a graphical representation of data quantifying the interactions illustrated in FIG. 14 as recorded in Table 1. The graph plots the percentage of the SA of the three illuminators and helps with visualizing the differences in how the concave SAVI (solid line) has a radically different interaction with the circle than either the rectangle (dashed line) or the convex SAVI (alternating long and short dashed line). In particular, the concave SAVI has virtually no change in % of SA until after step 3, whereas the rectangle has lost 22% of SA and the convex SAVI SA has fallen by 38% by this step. By step 4, the concave SAVI SA is still at 94% while the rectangle SA has dropped to 60% and the concave SAVI SA to 50%. The percentage of the illuminated SA that is visible from behind the circle for convex and concave SAVIs results in profoundly different interactions in relation to matching radial curves via curve parity and Lune geometry. The use of these geometries in the disclosed illuminators 100 (including illuminators 100-1, etc.), either singly or in multiples, offers dynamic photographic lighting that accentuates shape perception and the movement of curved objects.

In FIG. 15, the greatest % visible SA value change happens between steps 4 and 6, where the concave SAVI visible SA drops from 94% to 0%, creating a shutter effect. This is due to the parity of the concave arc with the curve of the circle as can be seen between steps 4 and 6 in FIG. 14. In contrast, the convex SAVI and rectangle offer visible SA all the way to step 10. The visible % SA of the convex SAVI and the visible % SA of the rectangle follow a similar trajectory. Although the convex SAVI's visible % SA drops off more than the rectangle in the early steps, it then actually follows a more uniform curve though the remaining steps.

The two-dimensional illustration presented in FIGS. 14 and 15 shows the novel interaction of SAVIs with similar radial curves of objects. In the three-dimensional world, spheres replace circles and SAVI illuminators create more dynamic interactions on the surface of the subject. As noted above, the thin arc width of the concave SAVI may create a shutter effect when interacting with curved objects. The concave SAVI's shutter effect shown in FIGS. 14 and 15 between steps 4 and 6 illustrates an effect that also works in three dimensions (e.g., with spherical photograph objects). Referring to FIG. 1, for example, when the arc-shaped light-emitting portion 110 and the curve 24 of a spherical object 20 are facing the same direction, a concave SAVI (e.g., arc-shaped light-emitting portion 110a) interacts with the spherical object 20 to create a dramatic illumination change with only a slight change in proximity. Conversely, a convex SAVI (e.g., arc-shaped light-emitting portion 110b) under the same conditions will have a more traditional lighting performance with even transitions from light to dark. This makes SAVIs (alone or in multiples) an invaluable tool for photographing spheroid subjects, allowing for a novel control over the three-dimensional effects of the lighting.

Figure 16:
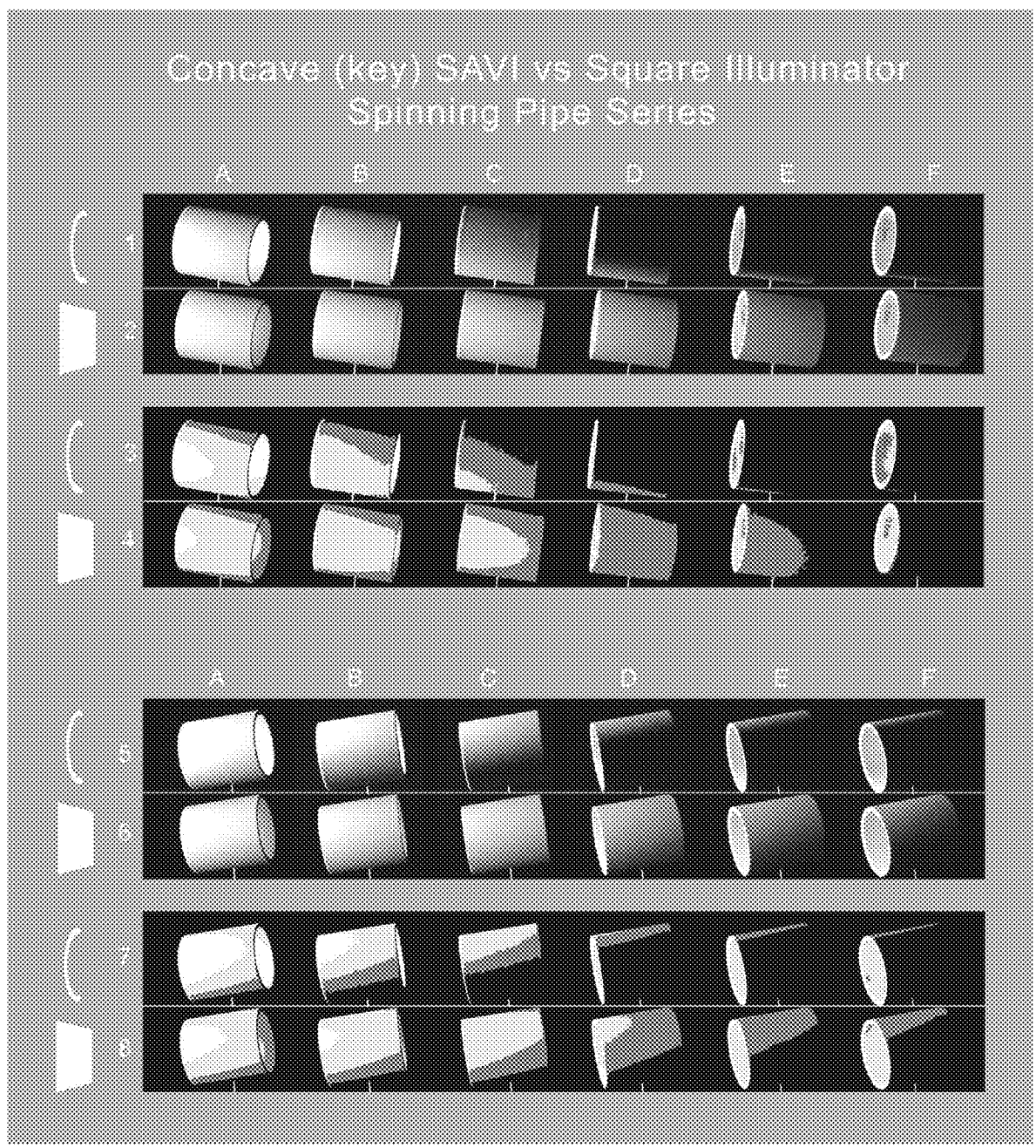
FIG. 16 shows a comparison between using an arc-shaped light-emitting portion of the disclosed illuminator(s) and a rectangular light source when illuminating a spinning pipe.

FIG. 16 shows a comparison between using a concave Key SAVI (e.g., arc-shaped light-emitting portion 110a of the illuminator 100 shown in FIG. 1) and a rectangular light source when illuminating a spinning pipe. The series of photographs shows a progression of still frames of a pipe (8 cm length, 3.5 cm radius) that is rotating from left to right (counterclockwise). The pipe is tilted at a 6-degree angle. Columns A through F show the progression of the turning pipe with the left side tilted up 6 degrees. Row 1 is photographed with the Key SAVI having parity with the curve of the side of the pipe facing the camera. Row 2 is photographed with a traditional rectangular Lambertian illuminator. Rows 3 and 4 are posterized versions of 1 and 2 to clarify the illumination boundaries. Rows 5 and 6 share the same lighting setup but with the left side of the pipe tilted down 6 degrees, and rows 7 and 8 are posterized versions of rows 5 and 6.

Comparing the two-dimensional example of FIGS. 14 and 15 with the example in FIG. 16, there is a direct correlation between the middle steps in both examples. In FIG. 15 the solid line corresponding to the concave (Key) SAVI illumination drops off sharply between steps 4 and 6 as discussed above, while the dashed line corresponding to the rectangle shows the light gradually dropping off. FIG. 16 shows this same effect in practice where the SAVI illumination drops off sharply between columns B and E, whereas the traditional illuminator drop is much more gradual. Thus, the photographic representation of FIG. 16 may be regarded as a three-dimensional analogue of the two-dimensional example of FIGS. 14 and 15.

FIG. 16 illustrates the novel, proximity-dependent enhanced dynamic illumination demonstrated by heightened three-dimensionality brought on through the interaction between radial curves and a SAVI. As noted above, the effect is like a shutter on the grazing angles of incident light on the object, with the thin arc width coupled with the eclipse 115 and horn masks 117, 119 (see FIG. 3) creating the effect when interacting with radial curves that match or nearly match the arc(s) defined by the SAVI. This is especially effective in motion picture and video recording where, compared to traditional lighting, SAVIs may bring more rapid changes on the rendering of the features of a photographic subject. This artifact of the SAVIs illumination makes for more dynamic photography of moving subjects.

Figure 17:
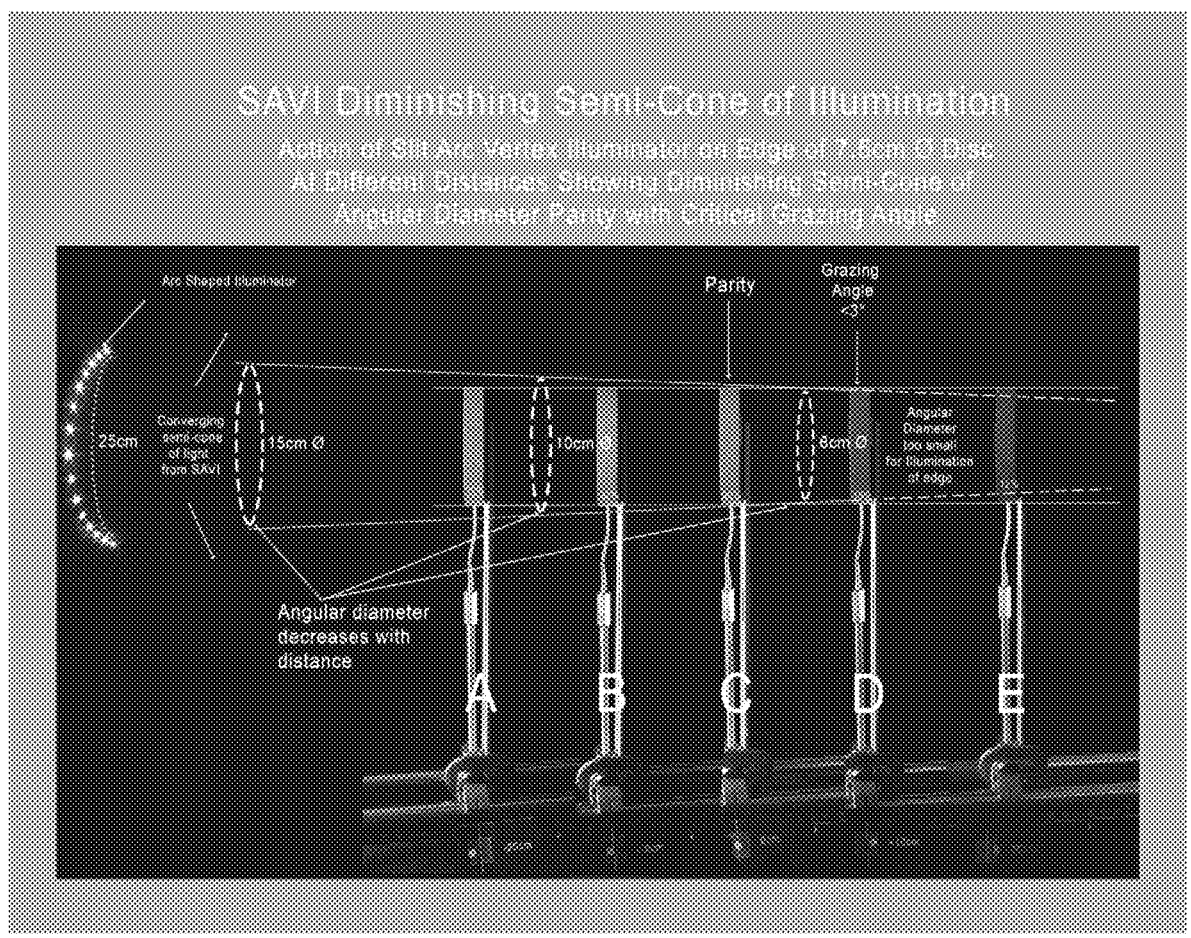
FIG. 17 shows a disc illuminated by an arc-shaped light-emitting portion of the disclosed illuminator(s)

FIG. 17 shows a disc illuminated by an arc-shaped light-emitting portion of the disclosed illuminator(s) 100. The disc (viewed from the side in FIG. 17) is a matte finish 7.5 cm diameter disc, and the arc-shaped light-emitting portion or SAVI has a radius of curvature equal to approximately 12.5 cm corresponding to a 25 cm diameter. In general, the parity of the radial curves in SAVIs and those on photographic subjects enhances illumination at a wide range of angles of incidence but especially at grazing angles, where diminishing cones of angular diameter have a strong effect. As light rays leave a Lambertian SAVI illuminator, they scatter, creating a widening arc of light with increasing distance. On the inside of the SAVI arc, the illumination boundary of this widening arc of light defines a diminishing semi-cone of illumination as illustrated in FIG. 17 having decreasing angular diameter. The edge of a disc-shaped object with radius less than the arc radius of the SAVI will be illuminated at grazing angles of incidence until the distance from the SAVI to the object causes the angular diameter of the cone to surpass some threshold angular diameter, namely the angular diameter at which the grazing angle with the edge of the object is less than the minimum grazing angle of incidence for illumination along that arc. In the example shown, the 7.5 cm diameter disc is illuminated by the 25 cm SAVI at a distance of 180 cm, indicated as "0 cm" at point "C" representing parity with the disc. Point "C" is the minimum angular diameter at which the semi-cone of illumination can still illuminate the edge of the disc and corresponds to the minimum grazing angle of incidence for illumination along the arc of the disc. Beyond this point the grazing angle of the light is too acute for meaningful illumination. For the matte disc of FIG. 17, there is a grazing angle limitation or minimum grazing angle of around 3 degrees (87 degrees from normal). Notice that the light intensity drops off at positions "D" and "E" (analogous to the shutter effect of FIGS. 14-16), as compared to the predicted illumination changes in "A" through "C" which follow the standard law of inverse squares where the intensity is inversely proportional to the square of the distance between illuminator and subject. Thus, the radial curve luminance is limited by the diminishing semi-cone of illumination, which may enhance the proximity lighting effect.

Notable exceptions to these effects include non-matte objects with more oblique angles that reflect more like a mirror. Another exception seen on human faces is illumination of vellus hair (peach fuzz) on the surface of skin which protrudes from the surface.

Figure 18:
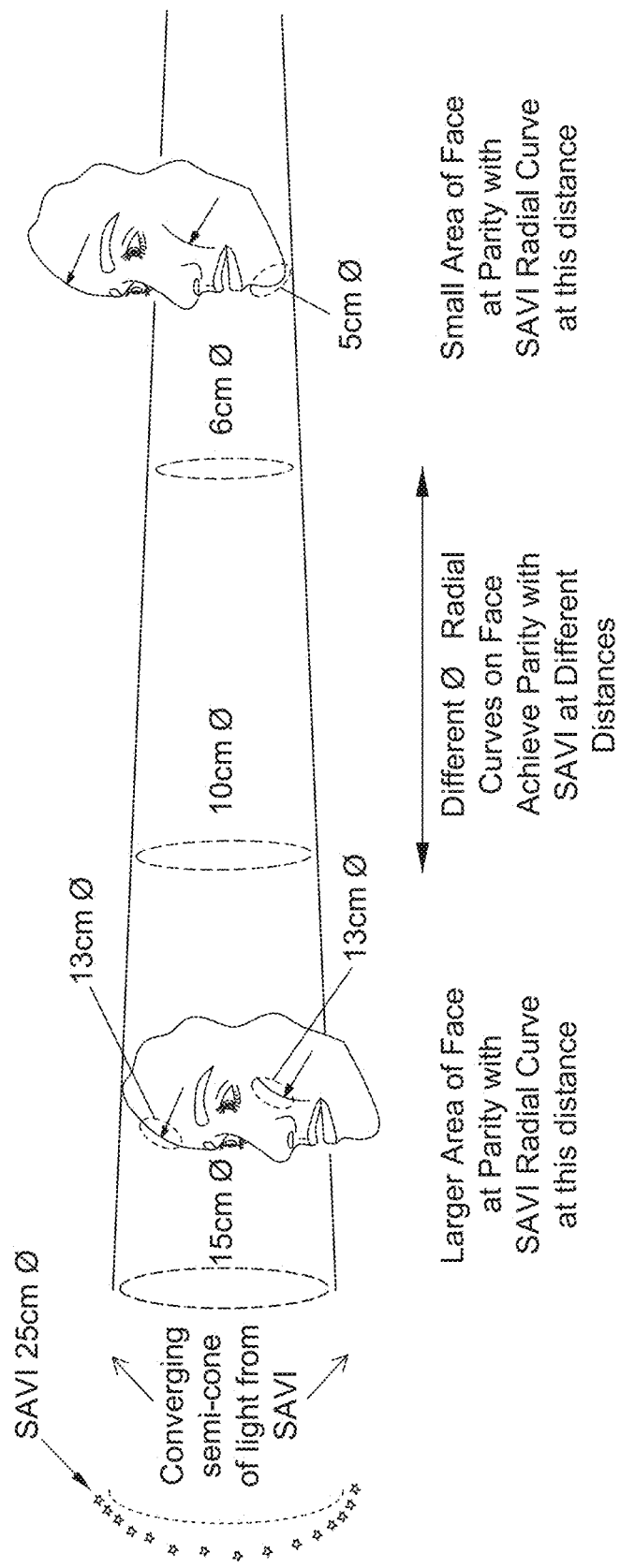
FIG. 18 shows a human face illuminated by an arc-shaped light-emitting portion of the disclosed illuminator(s)

FIG. 18 shows a human face illuminated by an arc-shaped light-emitting portion 110 of the disclosed illuminator(s) 100. In a photographic subject such as a human face (see FIG. 4) with multi-radii radial curves, the individual curved areas will reach parity with a single radius SAVI at different distances. In the face on the left side, the larger diameter curves (forehead and cheek) are at parity with the single radius SAVI. At this point those curves will have an illumination boundary transition zone at their peaks (small dashed-line ovals in FIG. 18). The face on the right is at a greater distance and so facial curves with smaller diameters (i.e., chin) will reach parity there. In this way, the parity of radii between illuminator and curved object may be affected by angular diameter and the diminishing semi-cone. The shifting of parity in facial radial curves at different distances is part of the novel proximity-based shape enhancement features of the SAVI.

As can be appreciated, SAVIs having multiple radii of curvature will accommodate photographic subjects having multiple radii of curvature, such as the human face. For example, a SAVI with multiple radii along a single arc, such as the arc-shaped light-emitting portion 110-2 of the illuminator 100-2 shown in FIG. 5, or a SAVI with multiple arcs having different radii, such as the contiguous arc-shaped light-emitting portions 110-3 of the illuminator 100-3 shown in FIG. 6, will reach parity at the same time with multiple radial curves of different radii as per the same effect shown in FIG. 17. As noted previously, the top of the arc-shaped light-emitting portion 110-2 has a larger radius of curvature than the bottom, which may simultaneously accommodate the curves made by the forehead and chin of a human face, for example. In an adjustable SAVI like the illuminator 100-3 of FIG. 6, changes in the adjustable SAVI segments can be made to reach parity with different radial curve diameters at desired distances by changing the shape of the diminishing semi-cone of illumination.

Figure 19:
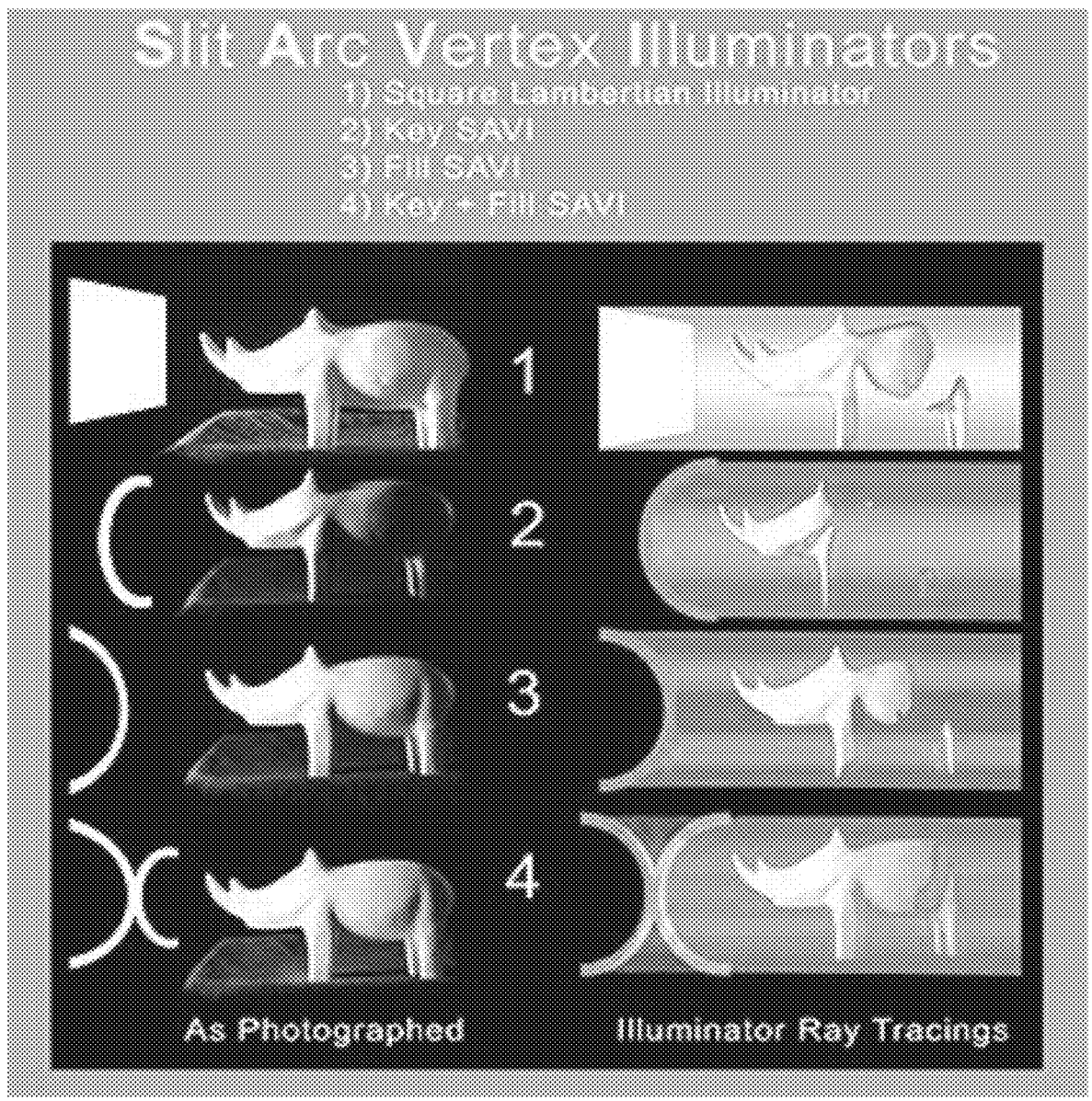
FIG. 19 shows a comparison between using arc-shaped light-emitting portions of the disclosed illuminator(s) and using a rectangular light source when illuminating a ceramic rhinoceros.

FIG. 19 shows a comparison between using arc-shaped light-emitting portions 110 of the disclosed illuminator(s) 100 and using a rectangular light source when illuminating a ceramic rhinoceros. Again, a Dual (Key and Fill) SAVI is arranged as in FIG. 1 with the vertices touching (or nearly touching). As demonstrated by the example of FIG. 19, manipulating the illumination intensity of multiple SAVIs will change apparent subject geometry. In general, the novel design of SAVI illuminators affects how the shape of the illuminator and the shape of a photographic subject interact. SAVIs project Lambertian (soft) light to some areas of the photographic subject, but the arc shape of the SAVI emphasizes the geometry of that subject as shown in row 2 of FIG. 19, making the features of the subject more prominent than with a square Lambertian illuminator as shown in row 1. In areas and edges of the subject that share radial curve parity with the direction of the arc, those curves will be emphasized. On complex shapes, a SAVI's geometry adds more definition than traditional light sources because the SAVI's effect is more dynamic than that of traditional illuminators. Thus, by using two or more SAVI illuminators (key and fill) and adjusting their intensity, it is possible to change the contrast ratio of photographic subjects in a novel manner.

In row 2 of FIG. 19, the Key SAVI is the dominant shaping illumination for the object, whereas the Fill SAVI (row 3) is used to control the shadow to highlight ratio. Traditionally, the key and fill light illuminators have been separate lighting units involving additional light stands and electrical distribution. One multiple SAVI unit such as the illuminator 100 shown in FIG. 1 can achieve the same effect and gives the user additional control over how the light shapes the photographic object. For example, as shown in FIG. 19, the photographic subject (ceramic rhinoceros) is illuminated by a standard rectangular Lambertian light source (row 1) and by SAVIs of different orientations (rows 2 to 4). Row 2 shows the illumination from the Key SAVI, outside the relative vertex angle (see FIG. 1). As the radial curve arc in the Key SAVI reaches parity with the convex radial curve shapes on the subject, it illuminates the outer edges of the curves in an accurate rendering of the outer edges of the curved shapes while adding very little illumination to the concave areas. The Fill SAVI (row 3) inside the relative angle vertex acts as a traditional fill light source, reducing the contrast of the image and controlling the apparent shape of the rhinoceros.

Controlling the intensity of the individual SAVIs controls the contrast and apparent shape of the subject, and in row 2 the rhino looks much smaller and petite than in row 1. Row 4 shows the use of the Key and Fill SAVIs together to create custom contrast and contouring manipulation. In this way, a Dual SAVI unit adjusts the shadow/highlight contrast of a photographic subject in the same way that multiple traditional photographic illuminators would achieve. This ability to change the apparent shape of curved objects on the fly is beyond the ability of conventional photographic illuminators.

Figure 20:
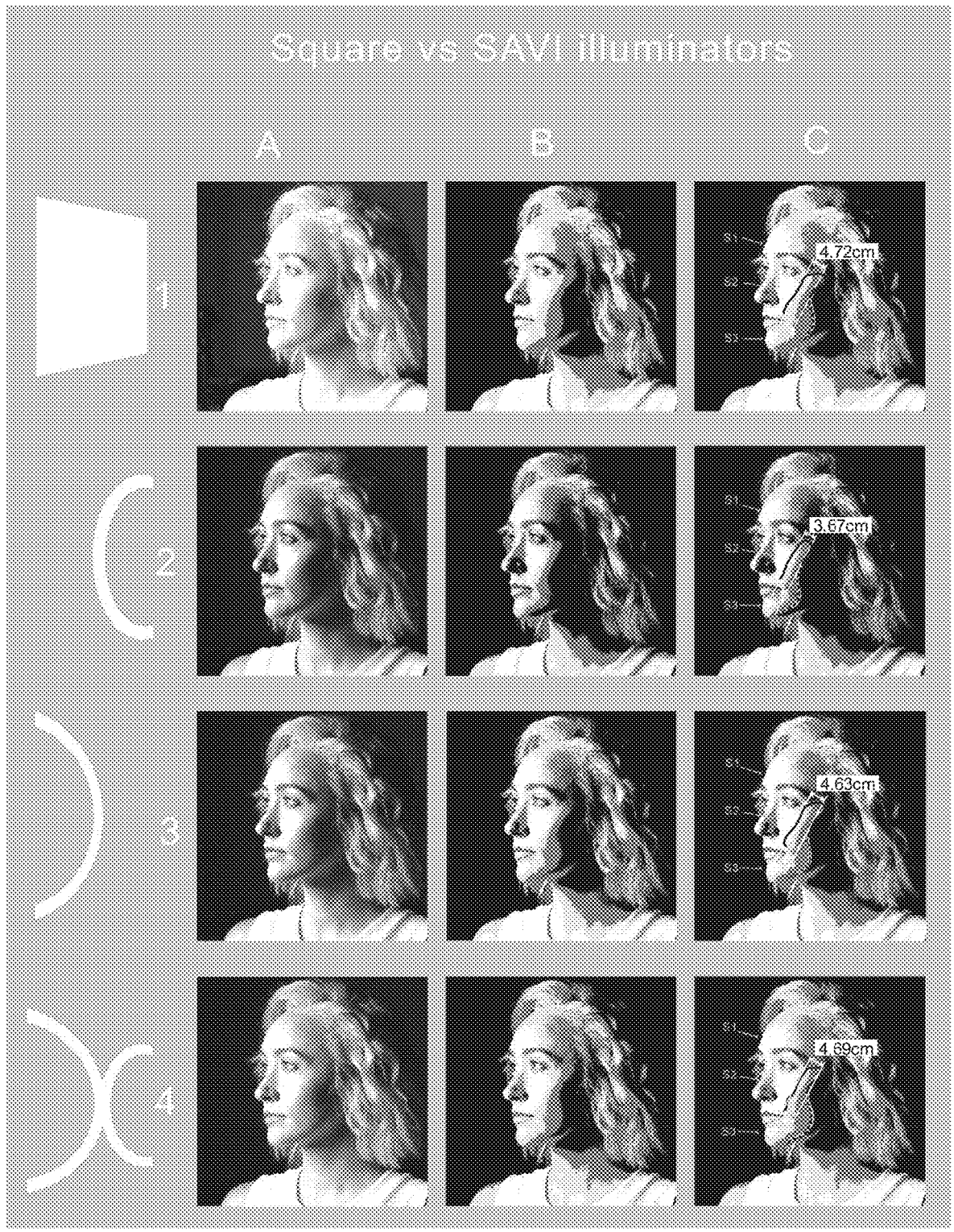
FIG. 20 shows a comparison between using arc-shaped light-emitting portions of the disclosed illuminator(s) and using a rectangular light source when illuminating a model's face.

FIG. 20 shows a comparison between using arc-shaped light-emitting portions 110 of the disclosed illuminator(s) 100 and using a rectangular light source when illuminating a model's face. Again, a Dual (Key and Fill) SAVI is arranged as the illuminator 100 in FIG. 1, with the vertices of the arc-shaped light-emitting portions 110 touching (or nearly touching). Column A is a series of black and white photographs of a female model in profile taken using a traditional square illuminator and the Key and Fill SAVIs. Column B is made up of posterized versions of the same photos to delineate the illumination boundaries and make them easier to analyze. In column C, the posterized photos have been marked to highlight different aspects of the lighting effects: the parallel white lines delineate the highlight-to-shadow illumination boundary width. The solid black curved lines follow the highlight on the cheek and then turn right from the eye to describe the shape of the boundary. The hatch-marked line continues to trace the path of the illumination boundary and shows how the illuminator is shaping the concave features of the hollow of the cheek, below the cheekbone. Point "X" is the end of the shadow that defines the jawline. "S1," "S2," and "S3" are points along the face where specular highlights from grazing angle illumination come into play.

Row 1 uses a square Lambertian illuminator. In column C the distance between the parallel white lines marking the illumination boundary measures 4.72 cm. This is the widest example in the column due to lack of radial curve parity with the square illuminator. Following the solid line up from the mouth area we see a slight curve before the eye area. As the solid black curved line turns right, it follows the illumination as it makes a bulge before following roughly parallel to the cheek highlight area. The bulge is a result of illumination coming from the corners of the square illuminator. Just before the cheekbone, the line turns into the hatch-marked line and then swings back to the right into the concave area of the hollow of the cheek. Taken together, the curves of the solid line and hatch-marked line describe the same toroidal distortion as shown in FIG. 12, row 1. The upper and lower horn masks 117, 119 (see FIG. 3) on the SAVI eliminate this artifact in row 2 of FIG. 20. The specular highlight areas marked "S1," "S2," and "S3" are right next to the edges of the face (as in the sphere in FIG. 12, row 1). The eclipse area 115 of the SAVI eliminates this artifact in row 2. Finally, the bottom of the jawline illumination boundary ("X") is well behind the model's eyes, making for a less defined chin area.

In row 2 of FIG. 20, the model is illuminated with a Key SAVI, effectively changing the apparent shape of the model's face. Because of the model's cheek radial curve parity with the SAVI there is a thinner illumination boundary area measuring 3.67 cm. The solid black curved line showing the concave shape of the cheek follows a more linear path with the "X" point of the jawline to the left of her eye. This makes for a thinner facial appearance and a more defined cheekbone and jawline. The specular highlights ("S1-S3") have moved away from the leading edge of the face (due to the eclipse area 115 of the SAVI analogous to FIG. 12, row 2). The repositioning of the specular highlights accentuates the spherical curves of the face.

In row 3 of FIG. 20, the illumination of the model is with the Fill SAVI only and mimics traditional illuminators, making an acceptable fill light without emphasizing the features. In row 4 of FIG. 20, the illumination of the model is from a Dual SAVI setup with both Key and Fill SAVIs in use as in FIG. 13, row 3. The face is more contoured with the cheek shadow (solid black line) following a more slimming path than the traditional illuminator. The "X" point of the jawline is forward compared to row 1. In actual practice, the intensity of each SAVI can be adjusted independently, offering novel flexibility in adjusting facial shape, shadows and highlight ratios.

Figure 21:
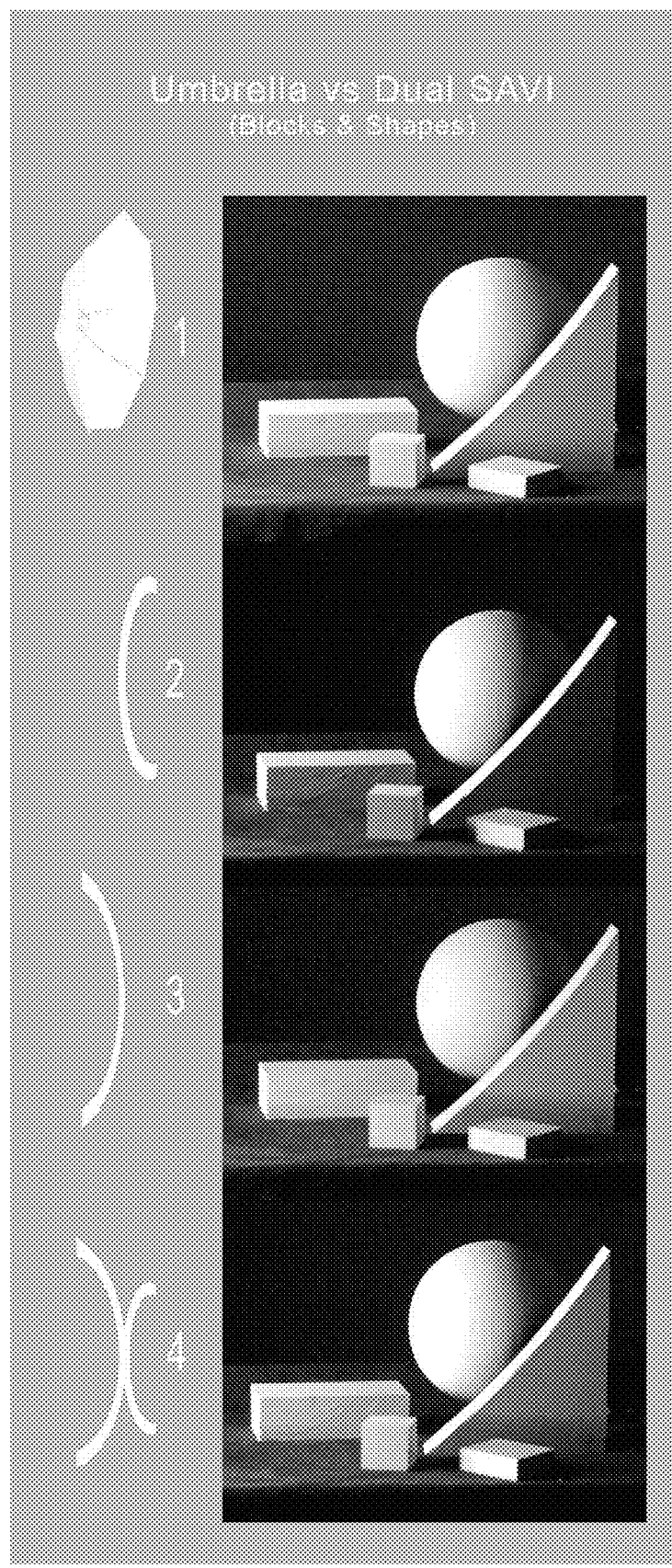
FIG. 21 shows a comparison between using arc-shaped light-emitting portions of the disclosed illuminator(s) and using another conventional soft light when illuminating various shapes.

FIG. 21 shows a comparison between using arc-shaped light-emitting portions 110 of the disclosed illuminator(s) 100 and using another conventional soft light, namely an umbrella, when illuminating various shapes. Again, a Dual (Key and Fill) SAVI is arranged as the illuminator 100 in FIG. 1, with the vertices of the arc-shaped light-emitting portions 110 touching (or nearly touching). While the umbrella might be regarded as providing a nice rendering of the shapes in row 1, the contouring and contrast ratios are fixed and cannot be adjusted. In row 2, the Key SAVI is used alone, creating a dramatic contrast ratio. In row 3, the Fill SAVI is used alone, and the lighting is flat as expected from a fill light. Row 4 is a balance of both SAVIs, demonstrating the wide range of effects and control over shapes achieved. By using multiple SAVIs (e.g., arranged as key and fill lights), the contrast ratio of the photographic subjects can be controlled as desired.

Figure 22:
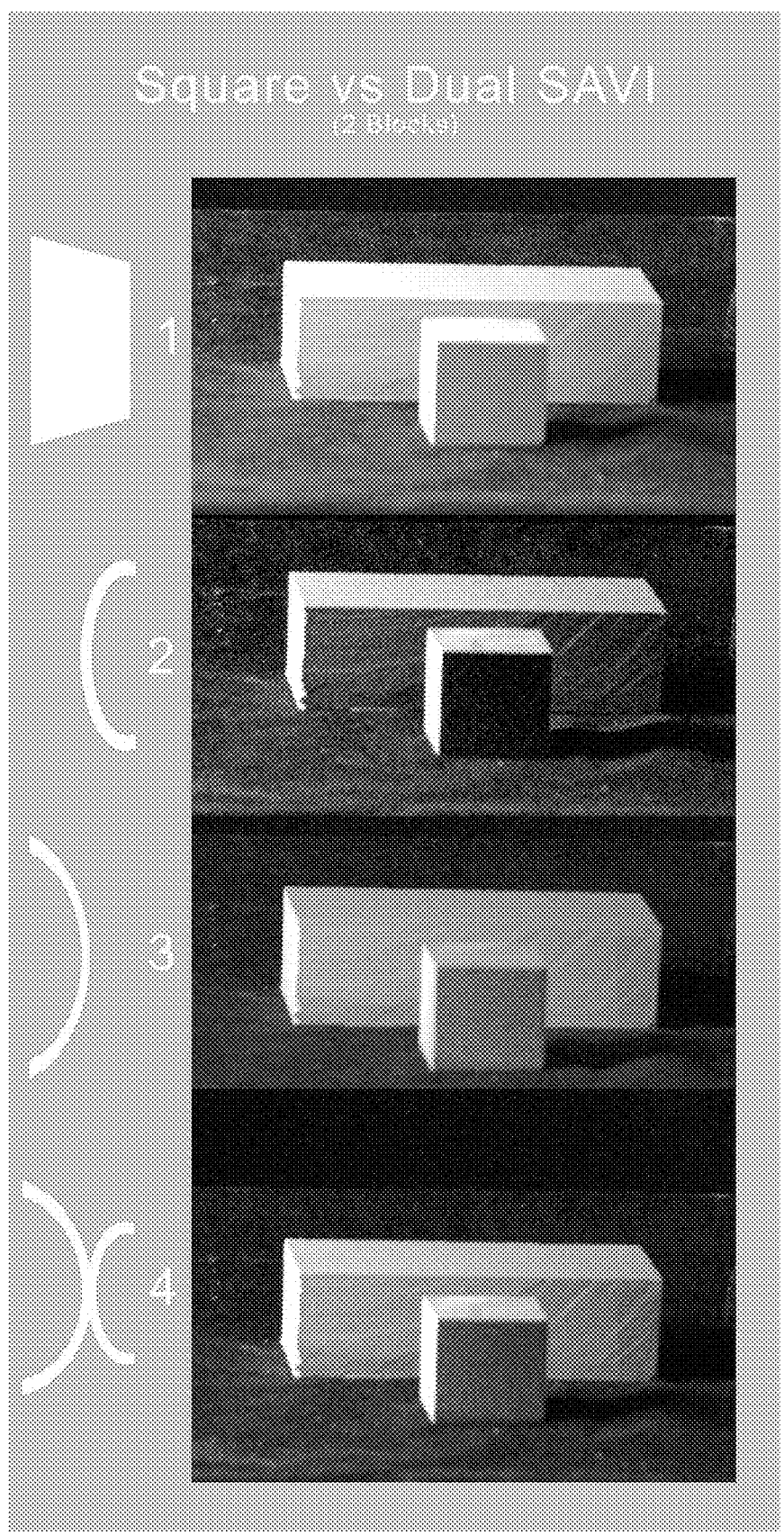
FIG. 22 shows a comparison between using arc-shaped light-emitting portions of the disclosed illuminator(s) and using a rectangular light source when illuminating the block shapes of FIG. 21.

FIG. 22 is a closer view of the block shapes, lit in this case with a rectangular soft light (row 1) and Dual SAVIs (rows 2 to 4). Rows 2 through 4 show examples of different contrast and contouring achieved with the system. In row 3, a simple adjustment of the illumination balance between the SAVIs creates the illusion that the top and side of the block facing the camera have no depth. Using traditional methods, this would be a painstaking effort, involving the physical movement of the lights as well as adjusting the light intensity.

Figure 23:
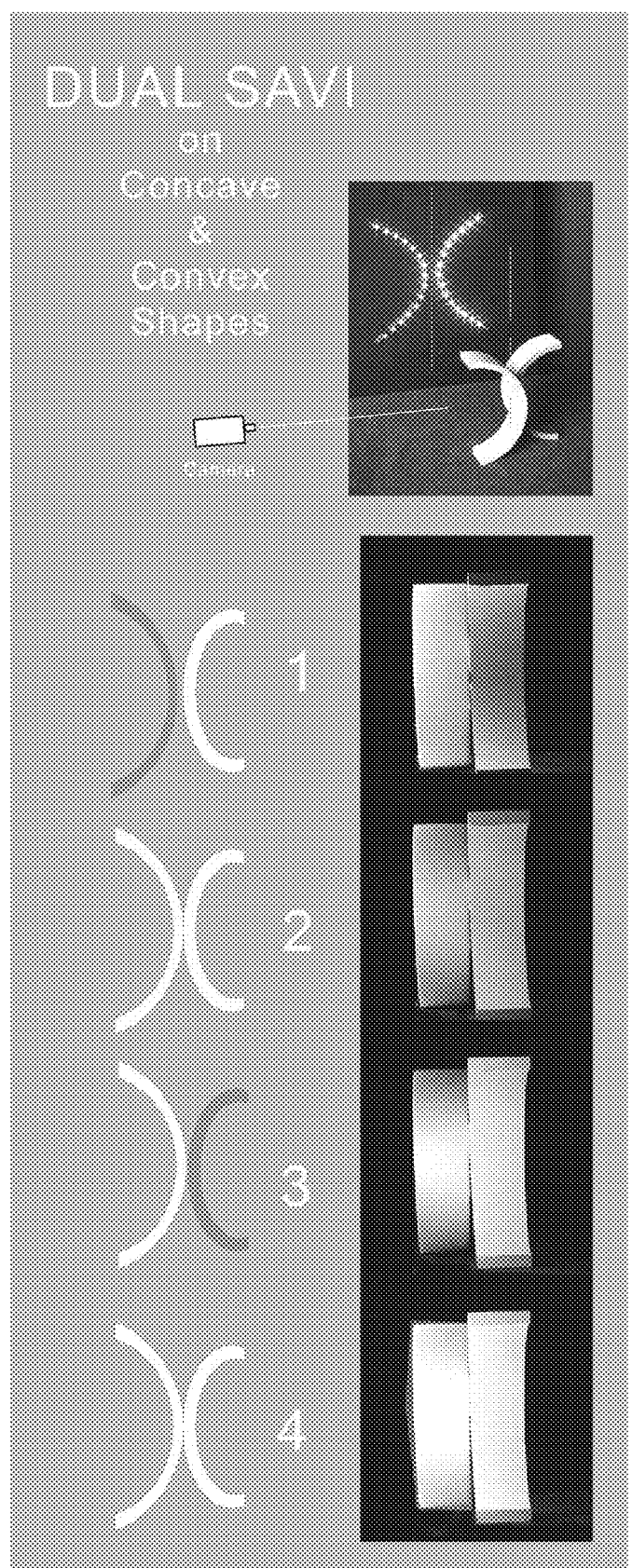
FIG. 23 shows convex and concave shapes being illuminated by the arc-shaped light-emitting portions of the disclosed illuminator(s)

FIG. 23 illustrates the novel interaction between a Dual SAVI system and concave and convex shapes. A 3 cm slice of plastic pipe has been bisected and the halves arranged with vertices touching along a vertical plane and side by side in the horizontal plane. When lit from the side with a Dual SAVI system such as the illuminator 100 of FIG. 1, the effects from the "Key" and "Fill" SAVI are shown in rows 1 through 4. (Traditional illuminators are not included because this type of image control is beyond their abilities.)

The image in Row 1 uses only the Key SAVI (e.g., arc-shaped light-emitting portion 110a) where the radial curves of the SAVI are at parity with the convex curve of the pipe on the left. Whereas this convex curve has relatively even illumination, the concave curve on the right has shadows that accentuate its shape. In row 2 both SAVIs (e.g. arc-shaped light-emitting portions 110a and 110b) are in use with their light intensity balanced to offer an accurate rendering of both the concave and convex shapes. Row 3 shows the illumination from the Fill SAVI (e.g., arc-shaped light-emitting portion 110b) only. This emphasizes the concave shape on the left because of the mismatch of the radial curves. The right concave curve, however, is at parity with the Fill SAVI and is evenly illuminated. In row 4, both SAVIs are at full intensity and both the concave and convex shapes are evenly illuminated. There is some definition in the curves, but the features are minimized. Each row demonstrates the novel features that multiple SAVIs have overshadow and highlight control of concave and convex objects. This makes a SAVI array an invaluable tool for photography of faces as well as table-top photography of objects.

Figure 24:
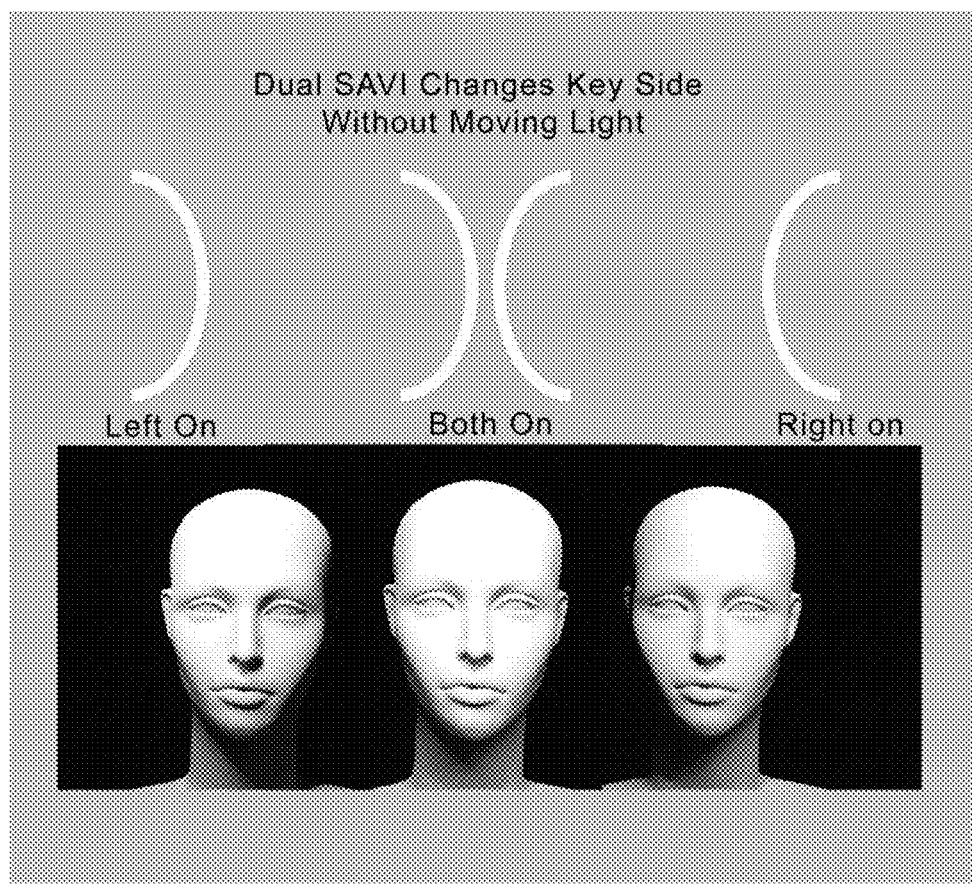
FIG. 24 shows a series of three photographs of a face illuminated by the arc-shaped light-emitting portions of the disclosed illuminator(s)

FIG. 24 shows a series of three photographs of a face illuminated by a Dual SAVI such as the illuminator 100 of FIG. 1. The photographs show how a Dual SAVI arranged on a neutral line from the camera to the subject (as opposed to at an angle as shown in FIG. 1) can be used to change the side of the apparent "key" source. This is especially important in portrait photography where multiple subjects may need to be photographed in rapid succession. The left image shows illumination from the left SAVI, the center image from both SAVIs, and the right image illumination from the right SAVI only. Each setting changes the rendering of the face without having to manually move the lighting instrument. In this way, a Dual SAVI when set on a neutral angle (e.g., directly in front of the subject) can change the apparent "key" side of a photographic subject by shifting the illumination intensity balance.

Figure 25:
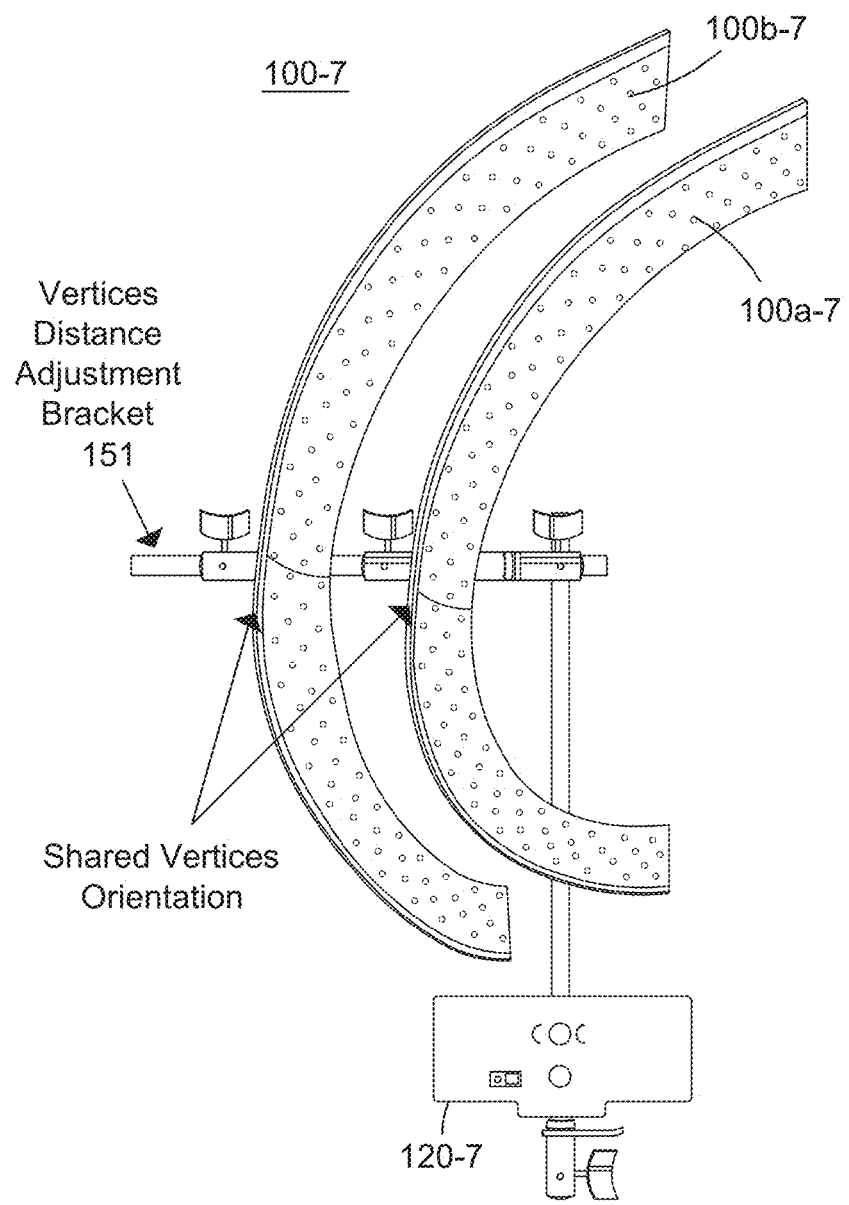
FIG. 25 shows an illuminator having multiple arc-shaped light-emitting portions arranged with convex sides facing the same direction.

FIG. 25 shows an illuminator 100-7 having multiple arc-shaped light-emitting portions 110a-7, 110b-7 arranged with convex sides 112a-7, 112b-7 facing the same direction, i.e., with the light-emitting portions 110a-7, 110b-7 in parallel. Such a device may be another example of a Dual SAVI. Like the illuminators 100-1, 100-2, 100-3, 100-4, 100-5, and 100-6, the illuminator 100-7 may be used as the illuminator 100 in FIG. 1 to illuminate the subject 20 whose image is to be captured by the camera 10. In particular, the illuminator 100-7 may be positioned relative to the subject 20 with the "flat" of the first arc-shaped light-emitting portion 110a-7 facing the subject 20 and with the first arc-shaped light-emitting portion 110a-7 facing the same direction as the first curve 24 of the subject 20 as described above. The illuminator 100-7 may be the same as the illuminator 100-2 shown in FIG. 5, with the first arc-shaped light-emitting portion 110a-7 defining an arc having multiple radii of curvature just like the arc-shaped light-emitting portion 110-2, except that the illuminator 100-7 may further include a second arc-shaped light-emitting portion 110b-7 defining another arc in the plane 111 that is offset relative to the arc defined by the first arc-shaped light-emitting portion 110a-7. Unlike the illuminator 100-4 of FIG. 8, however, the first and second arc-shaped light-emitting portions 110a-7, 110b-7 of FIG. 25 are arranged to face in the same direction, that is, with the convex side 112a-7 of the first light-emitting portion 110a-7 facing the concave side of the second light-emitting portion 110b-7. Here, the first and second arc-shaped light-emitting portions 110a-7, 110b-7 of FIG. 25 are separate, rather than contiguous like the multiple arc-shaped light-emitting portions 110-3 described in relation to FIG. 6.

When used as the illuminator 100 in the arrangement shown in FIG. 1, the second arc-shaped light-emitting portion 110b-7 of FIG. 8 may be used as the second arc-shaped light-emitting portion 110b of FIG. 1. However, in this case, the illuminator 100-7 may be positioned relative to the subject 20 so that the second arc-shaped light-emitting portion 110b-7 faces the same direction as the first curve 24 of the subject 20, rather than the opposite direction. The arc-shaped light-emitting portions 110a-7, 110b-7 may be arranged as in the illuminator 100-8, with the convex sides 112a-7, 112b-7 oriented to face the same direction, using, for example, a vertices adjustment bracket 151 as shown in FIG. 25. The vertices adjustment bracket 151 may include one or more joints, for example, which may allow the arc-shaped light-emitting portions 110a-7, 110b-7 to swivel, rotate, translate, etc. relative to each other and/or to the control box 120-7. It is contemplated that the vertices adjustment bracket 151 may be the same as the vertices adjustment bracket 150 shown in FIG. 8 and that the illuminator 100-4 may be modifiable into the illuminator 100-7 by appropriate operation of the vertices adjustment bracket 150. That is, both the relative orientation of the arc-shaped light-emitting portions 110a-4, 110b-4 and the relative orientation of the arc-shaped light-emitting portions 110a-7, 110b-7 may in some cases be within the range of adjustment of a single device. SAVIs can be oriented in the same direction as shown in FIG. 25 for special lighting effects (e.g., with colors) or to control a series of illumination boundaries from highlights to shadows.

Figure 26:
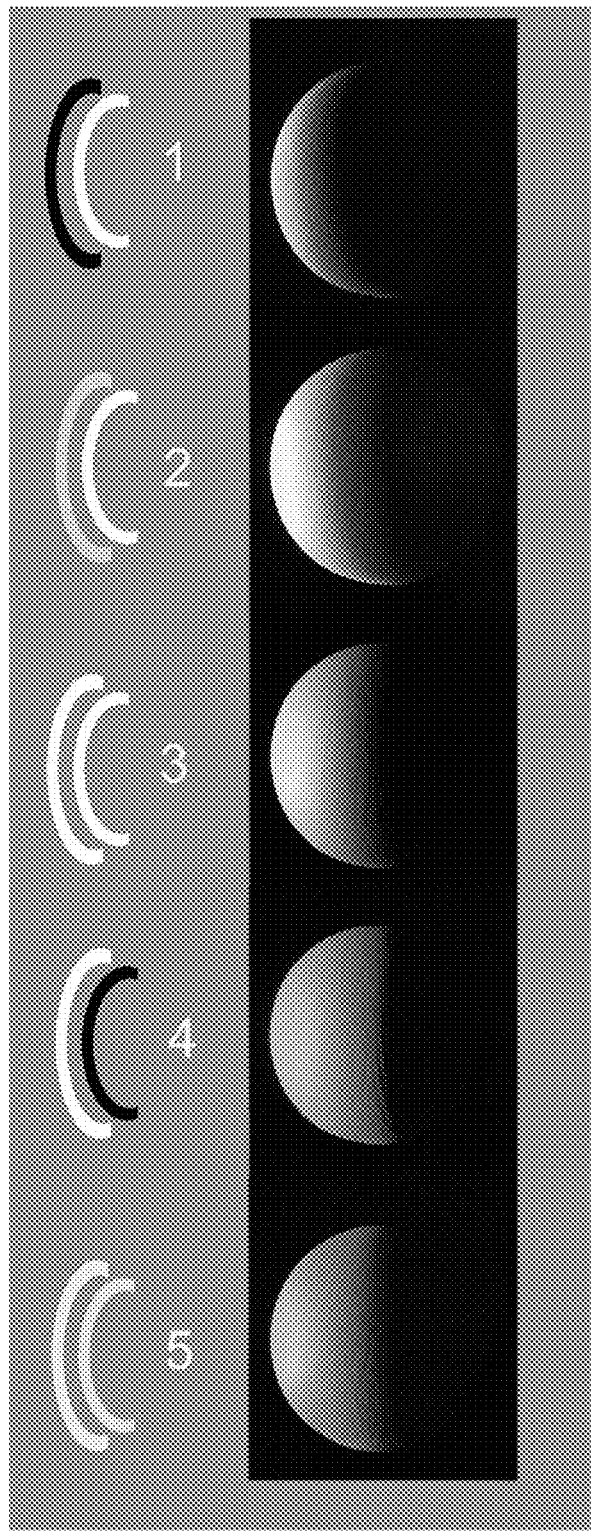
FIG. 26 shows a series of five photographs of a sphere taken using the illuminator of FIG. 25.

FIG. 26 shows a series of five photographs of a sphere taken using the illuminator 100-7 of FIG. 25. As described above, the two SAVIs (arc-shaped light-emitting portions 110a-7 and 110b-7) are arranged parallel to each other, such that both may be regarded as Key SAVIs (using the terminology of FIG. 1) and may be in key light position. In this configuration, both SAVIs match the radial curve of the near side of the sphere. In row 1, the farthest Key SAVI (arc-shaped light-emitting portion 110a-7 of FIG. 25) is used to illuminate the sphere, creating a crescent shape. In row 2, the second SAVI (arc-shaped light-emitting portion 110b-7) is illuminated to 50%, thus creating a crescent shape with a more diffused illumination boundary. Row 3 has both SAVIs at full illumination, creating a half-lit sphere with a natural-looking convex highlight. Row 4 uses only the closer SAVI (arc-shaped light-emitting portion 110b-7), creating a half-lit sphere with very little highlight shaping. By changing the intensity of the parallel SAVIs, the apparent shape and depth of curved objects such as the sphere can be modified.

By using different color SAVIs arrange in parallel, color highlight areas on spheroids can be controlled. Row 5 of FIG. 26 is a color photograph that shows two parallel SAVIs with different color filters in use (yellow and pale blue), though different colored LEDs (e.g., bi-color or RGBW LEDs) may be used instead of color filters. In practice any number of parallel SAVIs could be used, each using different colors to create proximity-based color cueing. This may be useful, for example, when it is desirable to create a lighting effect to match a real or CGI virtual background.

Figure 27A:
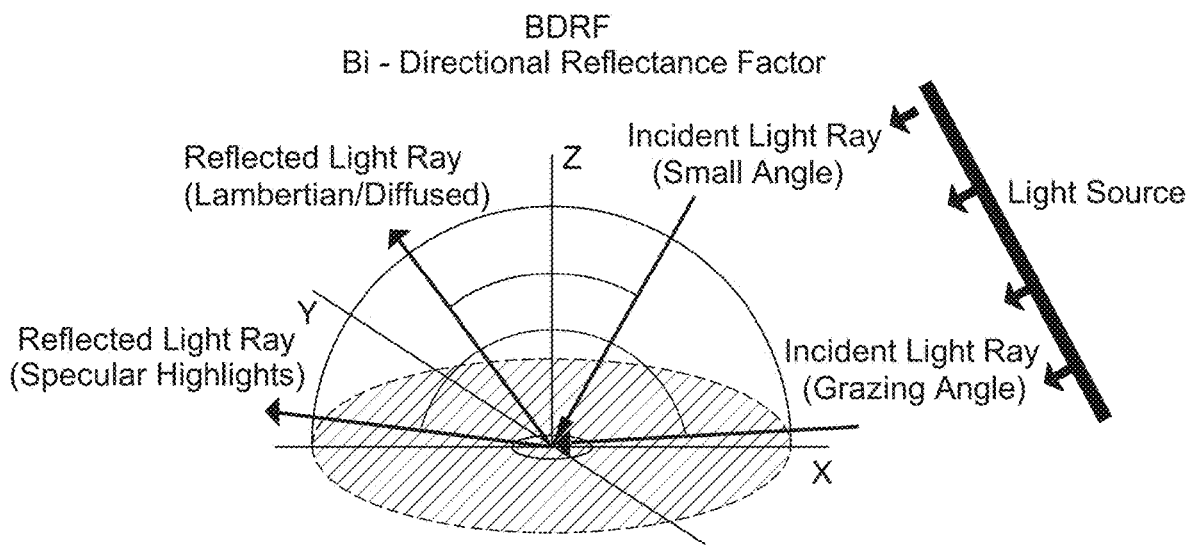
FIGS. 27A and 27B show a comparison between reflection characteristics of a surface when using a conventional light source and the disclosed illuminator(s), with FIG. 27A showing the conventional light source and FIG. 27B showing the effect of an eclipse area of the disclosed illuminator(s)
Figure 27B:
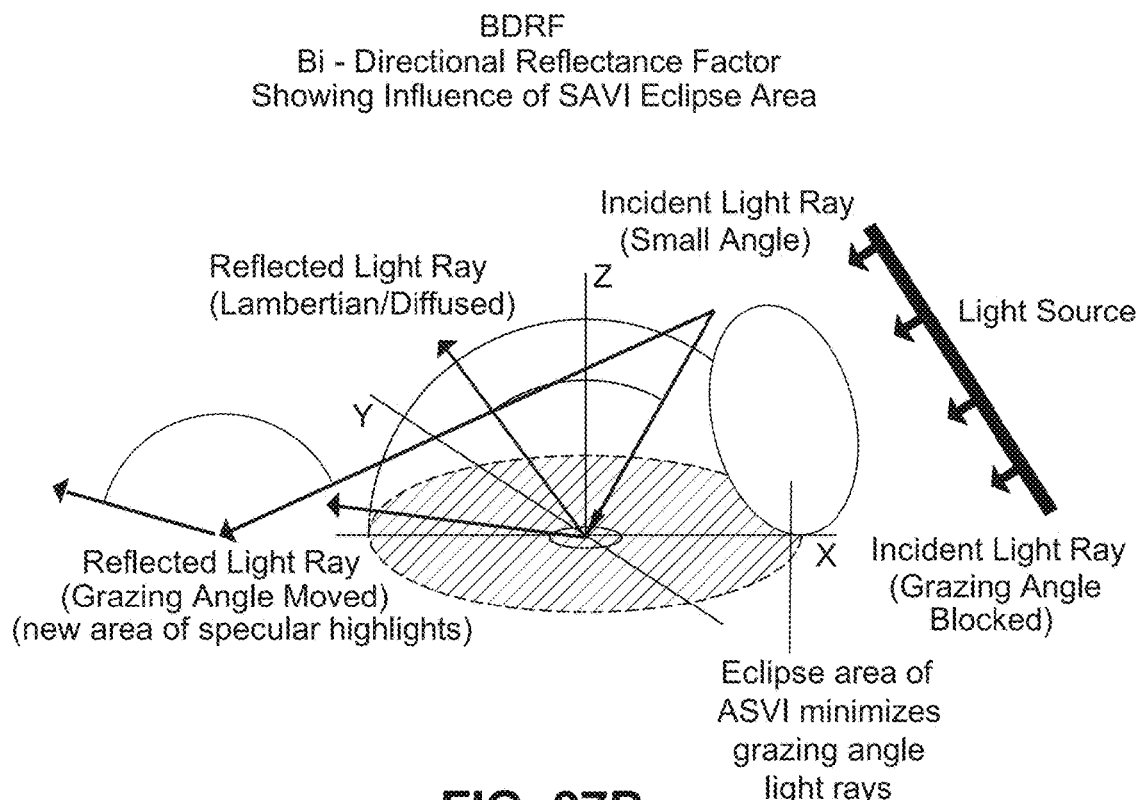

FIGS. 27A and 27B show a comparison between reflection characteristics of a surface when using a conventional light source and the disclosed illuminator(s) 100, with FIG. 27A showing the conventional light source and FIG. 27B showing the effect of an eclipse area 115 (see FIG. 3) of the disclosed illuminator(s). Another important consideration in lighting for cinematography and photography is the difference between photographing uniform surfaces and photographing human skin. Human skin is an optically complex photographic subject. One of the standard means of measuring reflection properties of a surface is the use of a bidirectional reflectance distribution function or bidirectional reflectance distribution factor (BDRF) formula, illustrated in FIG. 27A, that defines the spectral and spatial reflection characteristics of a given surface. The BDRF of human skin remains relatively consistent in the visible spectrum. However, it varies greatly with differing angles of incidence. FIG. 27B illustrates how the eclipse area 115 (see FIG. 3) of a SAVI desirably reduces the grazing angle illumination to effectively manage BDRF of human skin illumination.

Bidirectional scattering surface reflectance distribution function (BSSRDF) is another formula which describes the relationships between surface reflections and subsurface scattering. Both BDRF and BSSRDF formulas are important to the lighting and appearance of human skin. At small angles of incidence, human skin is almost Lambertian with soft and even reflective properties. However, as the angle of incidence increases so do the forward scattering properties of the reflection (specular highlights). When oily and/or deeper skin tones are illuminated at high angles of incidence, there is the possibility of loss of skin color and detail, as typically happens when using a traditional soft light shape.

Figure 28:
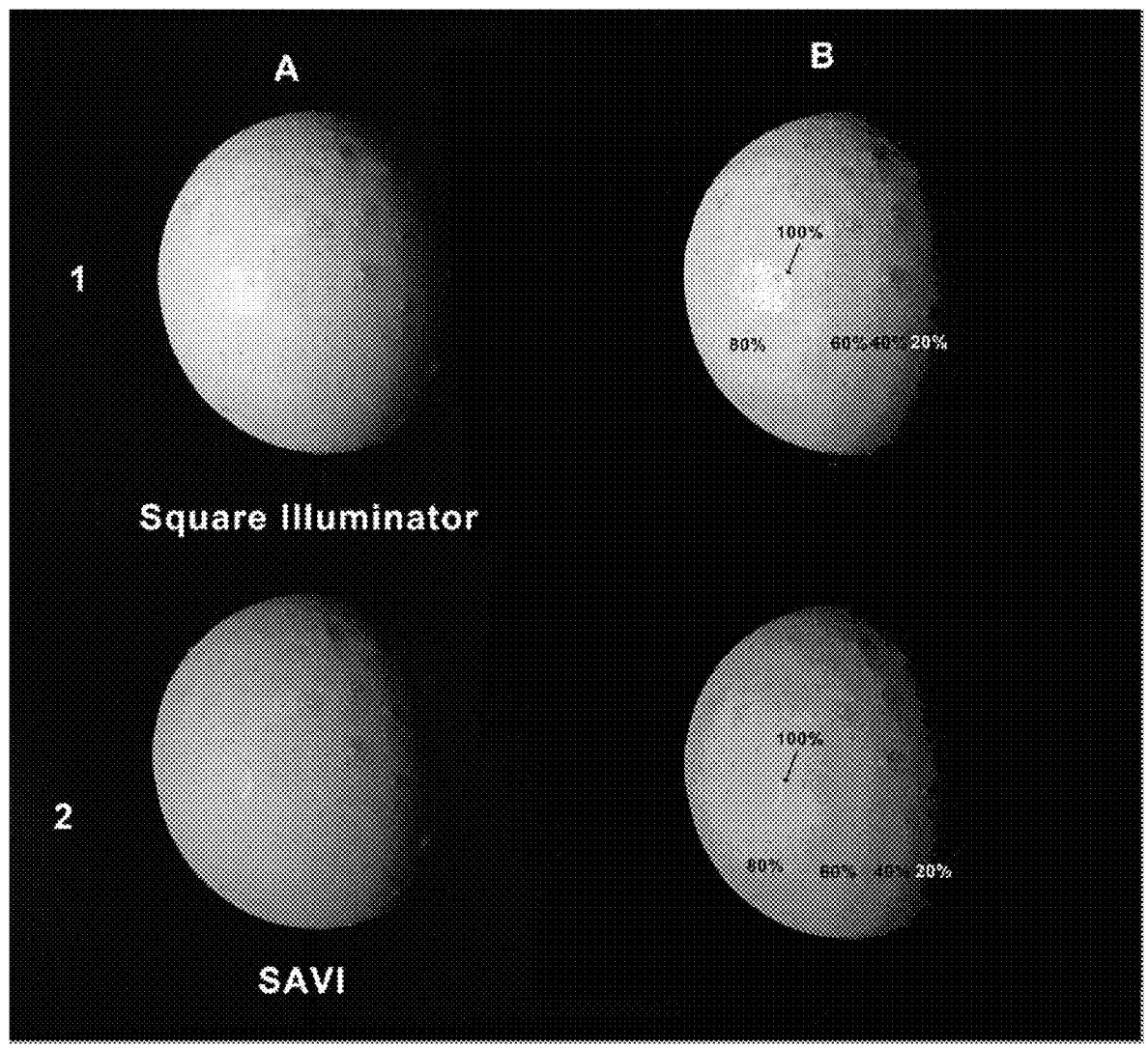
FIG. 28 shows a comparison between using arc-shaped light-emitting portions of the disclosed illuminator(s) and using a conventional rectangular light source when illuminating a sphere coated with a human skin analogue.

FIG. 28 shows a comparison between using arc-shaped light-emitting portions 110 of the disclosed illuminator(s) 100 and using a conventional rectangular light source when illuminating a sphere coated with a human skin analogue. The sphere is coated with a human skin analogue complete with multiple skin layers with optical qualities that correspond to the BDRF model. Row 2 shows how the eclipse 115 and horn masking areas 117, 119 (see FIG. 3) of the SAVI control the specular highlights and allow a more desirable imaging of the surface of the skin. By contrast, the images of the object in row 1, which are illuminated with a traditional rectangular illuminator, have washed-out skin tones in the highlight area.

In column B of FIG. 28, the images have been turned black-and-white and posterized to better realize common illumination areas and the demarcation of their boundaries. The specular highlights are measured at 100% intensity with little color or texture information. In column B, row 1, the area of 100% intensity is large in comparison to that of row 2. On facial portrait photography, the image in row one may lead to the conclusion that the skin is oily or shiny. By comparison, in the image in column B, row 2, the 100% specular highlight area is relatively small. The 80% illumination is also larger in row 1, photographed with a traditional rectangular illuminator, than in row 2, photographed with a Key SAVI. This larger 80% highlight area causes the spherical shape to appear less contoured. Overall, in column B, row 2, the illumination areas and boundaries are more spread out (60%, 40%, 20%) over the surface of the sphere, creating a smoother transition from shadow to highlight and more accurately representing the shape.

Throughout the above disclosure, various arc-shaped light-emitting portions 110 (also called SAVIs) are described in relation to various example illuminators 100 (including illuminators 100-1, 100-2, 100-3, 100-4, 100-5, 100-6, and 100-7 as well as variations and combinations thereof). The arcs defined in the plane 111 by such arc-shaped light-emitting portions 110 may be circular curves, parabolic curves, or any other types of curves and may have multiple radii of curvature as described herein. It is contemplated that the arcs defined by the arc-shaped light-emitting portions 110 may be of a type that does not curve so far as to extend past the point of doubling back on itself. For example, in some implementations, the arcs may bend only so far as to trace a half-circle or approximately a half-circle (or a half-oval or approximately a half-oval) in the plane 111, or less, without bending so far as to form a nearly complete circle.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of illuminating a subject to be filmed or photographed, the method comprising:
   providing an illuminator having a first arc-shaped light-emitting portion defining an arc in a plane; and
   positioning the illuminator relative to the subject so that a line extending from the first arc-shaped light-emitting portion to the subject is orthogonal to the plane and the first arc-shaped light-emitting portion faces the same direction as a first curve of the subject,
   wherein said positioning includes positioning the illuminator at a distance from the subject that achieves parity between the first arc-shaped light-emitting portion and the first curve of the subject.

2. The method of claim 1, wherein the illuminator further has a second arc-shaped light-emitting portion defining another arc in the plane that is offset relative to the arc defined by the first arc-shaped light-emitting portion.

3. The method of claim 2, wherein said positioning includes positioning the illuminator relative to the subject so that the second arc-shaped light-emitting portion faces the opposite direction as the first curve of the subject.

4. The method of claim 3, wherein said positioning includes positioning the illuminator relative to a camera so that the second arc-shaped light-emitting portion is within an angle defined between the line extending from the first arc-shaped light-emitting portion to the subject and a line extending from the camera to the subject.

5. The method of claim 2, wherein said positioning includes positioning the illuminator relative to the subject so that the second arc-shaped light-emitting portion faces the same direction as the first curve of the subject.

6. The method of claim 2, wherein the arc defined by the second arc-shaped light-emitting portion is contiguous with the arc defined by the first arc-shaped light-emitting portion, and said positioning includes positioning the illuminator relative to the subject so that the second arc-shaped light-emitting portion faces the same direction as a second curve of the subject.

7. The method of claim 6, wherein said positioning includes positioning the illuminator at a distance from the subject that achieves parity between the first arc-shaped light-emitting portion and the first curve of the subject and between the second arc-shaped light-emitting portion and the second curve of the subject.

8. The method of claim 6, further comprising adjusting an orientation of the second arc-shaped light-emitting portion relative to the first arc-shaped light-emitting portion.

9. The method of claim 2, further comprising controlling a relative intensity of light emitted by the first and second arc-shaped light-emitting portions.

10. The method of claim 9, further comprising controlling an overall intensity of light emitted by the first and second arc-shaped light-emitting portions while the relative intensity remains constant.

11. The method of claim 2, wherein the first and second arc-shaped light-emitting portions emit light of different colors.

12. The method of claim 11, further comprising applying one or more color filters to the illuminator so that the first and second arc-shaped light-emitting portions emit light of different colors.

13. The method of claim 1, wherein the illuminator comprises an array of light-emitting diodes, with the first arc-shaped light-emitting portion being an illuminated subset thereof.

14. The method of claim 13, wherein the array of light-emitting diodes includes an unilluminated subset on a concave side of the first arc-shaped light-emitting portion and one or more unilluminated subsets on a convex side of the first arc-shaped light-emitting portion.

15. The method of claim 1, wherein the illuminator comprises a base plate attached to the first arc-shaped light-emitting portion and a mount for mounting the base plate at a position relative to the subject.

16. An illuminator for photography or cinematography, the illuminator comprising:

a first base plate;

a first arc-shaped light source disposed on the first base plate and defining an arc in a plane;

a second base plate; and a second arc-shaped light source disposed on the second base plate and defining another arc in the plane, the first and second arc-shaped light sources arranged such that a convex side of the first arc-shaped light source faces a convex side of the second arc-shaped light source.

17. A method of illuminating a subject to be filmed or photographed, the method comprising:

providing an illuminator having a first arc-shaped light-emitting portion defining an arc in a plane and having a second arc-shaped light-emitting portion defining another arc in the plane that is offset relative to the arc defined by the first arc-shaped light-emitting portion; and positioning the illuminator relative to the subject so that a line extending from the first arc-shaped light-emitting portion to the subject is orthogonal to the plane and the first arc-shaped light-emitting portion faces the same direction as a first curve of the subject, wherein said positioning includes positioning the illuminator relative to the subject so that the second arc-shaped light-emitting portion faces the opposite direction as the first curve of the subject, wherein said positioning includes positioning the illuminator relative to a camera so that the second arc-shaped light-emitting portion is within an angle defined between the line extending from the first arc-shaped light-emitting portion to the subject and a line extending from the camera to the subject.

18. A method of illuminating a subject to be filmed or photographed, the method comprising:

providing an illuminator having a first arc-shaped light-emitting portion defining an arc in a plane and having a second arc-shaped light-emitting portion defining another arc in the plane that is offset relative to the arc defined by the first arc-shaped light-emitting portion; and positioning the illuminator relative to the subject so that a line extending from the first arc-shaped light-emitting portion to the subject is orthogonal to the plane and the first arc-shaped light-emitting portion faces the same direction as a first curve of the subject, wherein the arc defined by the second arc-shaped light-emitting portion is contiguous with the arc defined by the first arc-shaped light-emitting portion, and said positioning includes positioning the illuminator relative to the subject so that the second arc-shaped light-emitting portion faces the same direction as a second curve of the subject, wherein said positioning includes positioning the illuminator at a distance from the subject that achieves parity between the first arc-shaped light-emitting portion and the first curve of the subject and between the second arc-shaped light-emitting portion and the second curve of the subject.

19. A method of illuminating a subject to be filmed or photographed, the method comprising:

providing an illuminator having a first arc-shaped light-emitting portion defining an arc in a plane; and positioning the illuminator relative to the subject so that a line extending from the first arc-shaped light-emitting portion to the subject is orthogonal to the plane and the first arc-shaped light-emitting portion faces the same direction as a first curve of the subject, wherein the illuminator comprises an array of light-emitting diodes, with the first arc-shaped light-emitting portion being an illuminated subset thereof, wherein the array of light-emitting diodes includes an unilluminated subset on a concave side of the first arc-shaped light-emitting portion and one or more unilluminated subsets on a convex side of the first arc-shaped light-emitting portion.

* * * * *